(12) United States Patent
Comair

(10) Patent No.: US 7,844,424 B2
(45) Date of Patent: Nov. 30, 2010

(54) HUMAN BEHAVIORAL MODELING AND SIMULATION FRAMEWORK

(75) Inventor: Claude Comair, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 355 days.

(21) Appl. No.: 11/958,752

(22) Filed: Dec. 18, 2007

(65) Prior Publication Data

US 2008/0294399 A1  Nov. 27, 2008

Related U.S. Application Data

(60) Provisional application No. 60/892,422, filed on Mar. 1, 2007.

(51) Int. Cl.
*G06F 17/50* (2006.01)
*G06F 9/455* (2006.01)

(52) U.S. Cl. .............................. 703/2; 703/22; 704/255; 704/257; 707/3; 707/4; 707/5; 345/419

(58) Field of Classification Search ................ 703/2, 703/22; 704/255, 257; 707/3–5; 345/419
See application file for complete search history.

(56) References Cited

U.S. PATENT DOCUMENTS

| 6,192,512 | B1 | 2/2001 | Chess | |
|---|---|---|---|---|
| 6,377,263 | B1 | 4/2002 | Falacara et al. | |
| 7,089,281 | B1 * | 8/2006 | Kazemi et al. | 709/203 |
| 7,555,431 | B2 * | 6/2009 | Bennett | 704/255 |
| 7,725,320 | B2 * | 5/2010 | Bennett | 704/255 |
| 7,729,904 | B2 * | 6/2010 | Bennett | 704/215 |

(Continued)

FOREIGN PATENT DOCUMENTS

WO  WO03058518 A2  7/2003

(Continued)

OTHER PUBLICATIONS

Balcisoy et al., "Interaction techniques with virtual humansn in mixed environments", Biomedical Imaging v. Proceesings of the 5th IEEE EMBS International Summer School on Biomedical Imaging, Piscataway NJ, US, 2003, pp. 6.

(Continued)

*Primary Examiner*—Thai Phan
(74) *Attorney, Agent, or Firm*—Yee & Associates, P.C.; John A. Lepore

(57) ABSTRACT

A computer implemented method, apparatus, and computer usable program code for simulating human behavior. Source code, written in a language for predicting human behavior, is located on a storage system in a network data processing system. An interpreter executing on hardware has a language interpreter and a communications module. The language interpreter executes a simulation with the source code using artificial intelligence to generate a new definition and interpreted source code. A graphical user interface processor receives the interpreted source code from the language interpreter and generates device dependent output. Devices display the device dependent output, receive user input, and send received user input to the graphical user interface processor. The communications module receives the received user input from the graphical user interface processor and the new definition from the language interpreter and modifies the source code to form modified source code that is executed by the language interpreter.

18 Claims, 27 Drawing Sheets

U.S. PATENT DOCUMENTS

| | | |
|---|---|---|
| 2007/0013692 A1 | 1/2007 | Jung et al. |
| 2007/1013009 | 6/2007 | Hanneman et al. |
| 2008/0215508 A1* | 9/2008 | Hanneman et al. ............ 706/11 |
| 2008/0301631 A1* | 12/2008 | Comair ....................... 717/111 |

FOREIGN PATENT DOCUMENTS

WO PCT/US2008/055568    12/2007

OTHER PUBLICATIONS

Piza et al., "Using a declarative language to describe the interactions in virtual scenes", Proceedings 11th International Conference on Parallel and Distributed Systems, IEEE Comput. Soc., Los Alamitos, CA, vol. 2, 2005, pp. 224-228.

Nigel Gilbert, "Emerging Artificial Societies Through Learning", Journal of Artificial Societies and Social Simulation, vol. 9, No. 2, Mar. 2006, pp. 1-20 http://jasss.soc.surrey.ac.uk/9/2/9.htm.

Gulyas Laslo, "The Multi-Agent Modelling Language and the model Design Interface", Journal of Artificial Societies and Social Simulation (Online), vol. 2, No. 3, pp. 1-21, http://jasss.soc.surrey.ac.uk/2/3/8.html.

Pandzic et al., "A flexible architecture for virtual humans in networked collaborative virtual environments", Computer Graphics Forum Blackwell Publishers for Eurographics Assoc., UK, vol. 15, No. 3, 1997, pp. C177-C188.

* cited by examiner

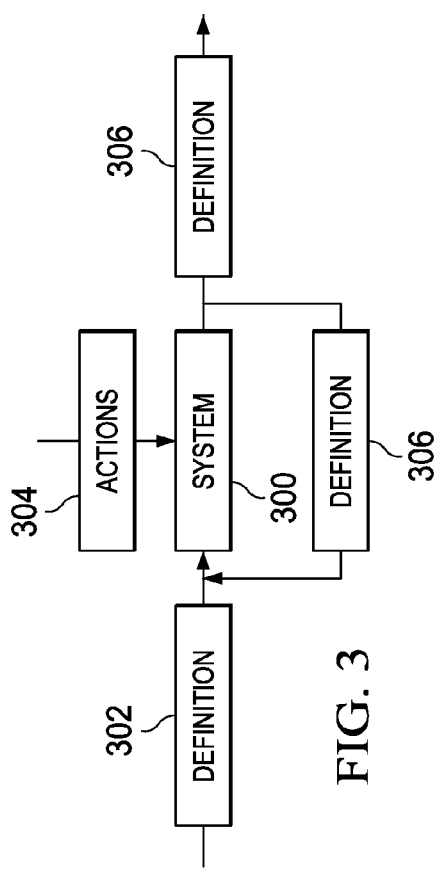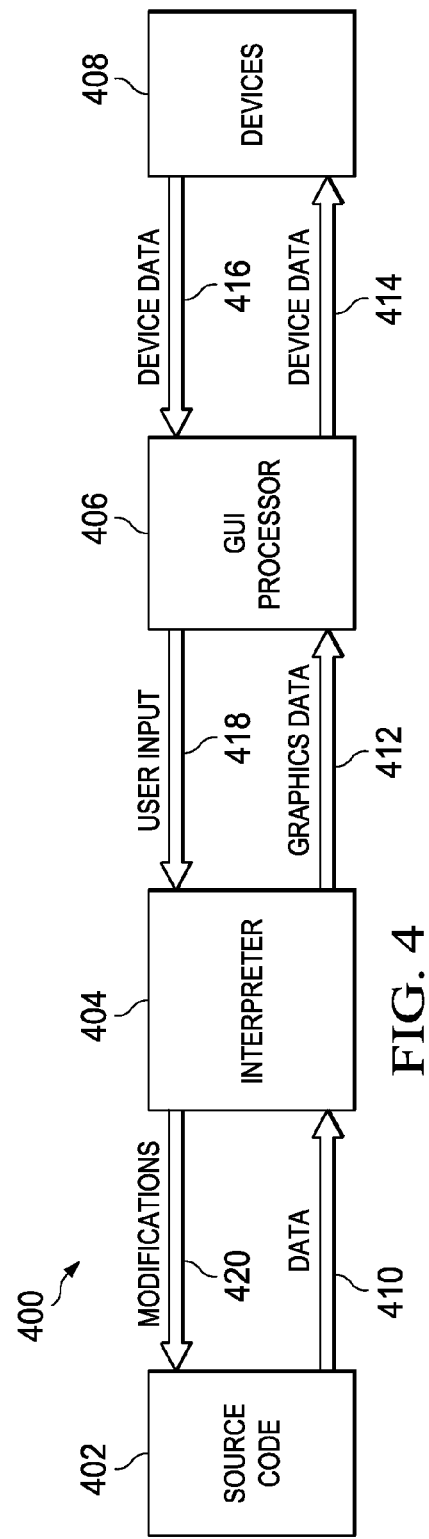

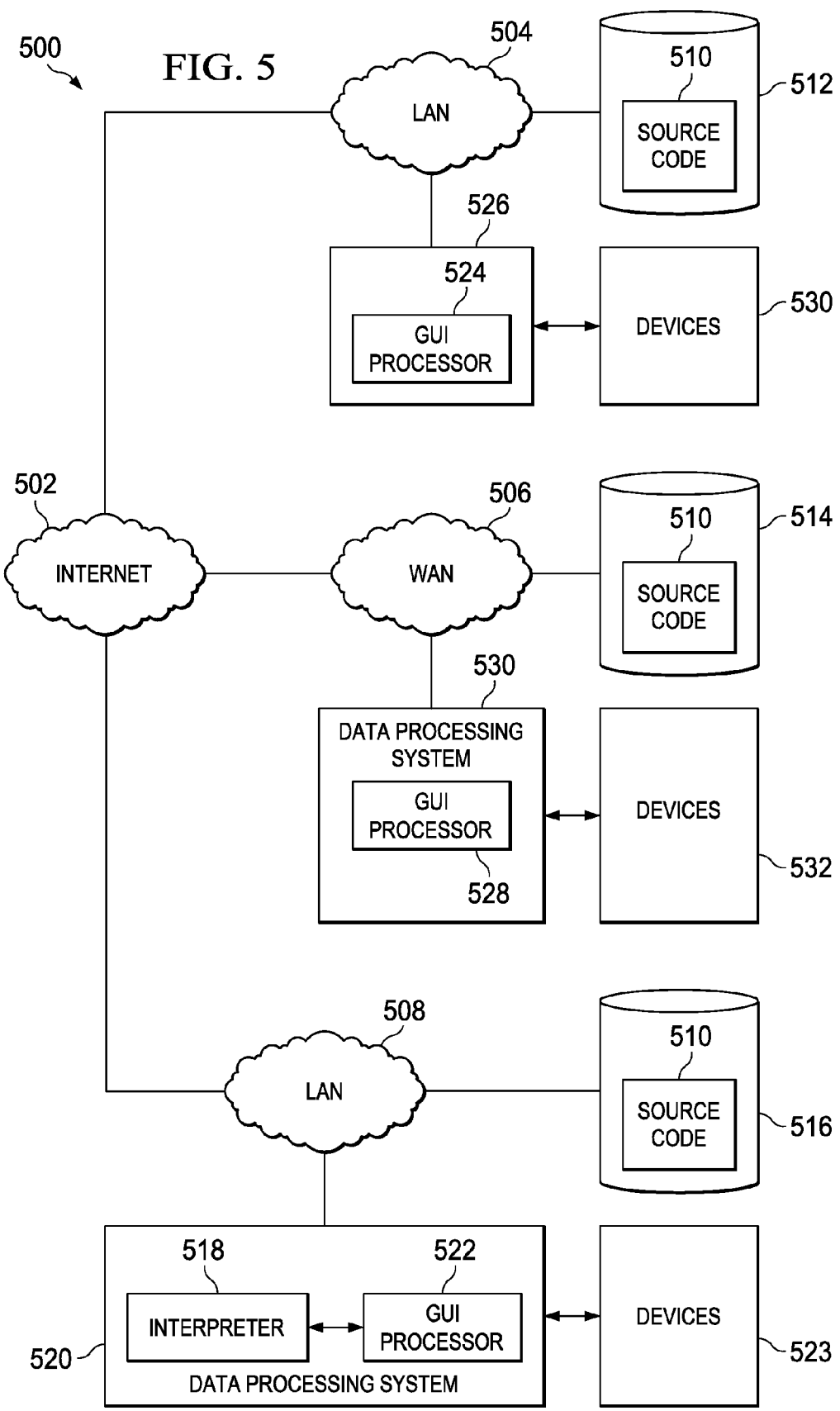

3404

3400 — int n.input.leftOperand; //n.input ==1;
3402 — int n.input.rightOperand; //n.input ==2;

FIG. 34

3500 — float n.input.leftOperand.min=-10;
3502 — float n.input.leftOperand.max=10;

FIG. 35

3600 — code n.input.leftOperand.behavior=loCode;

FIG. 36

3700 — int n.output.result;

FIG. 37

3800 — float n.output.result.min=-50;
3802 — float n.output.result.max=50;

FIG. 38

3900 — code n.output.result.behavior=resultCode;

FIG. 39

4000 — int n.hidden.hl1=5; //n.hidden ==1;
4002 — int n.hidden.hl2=3; //n.hidden ==2;

FIG. 40

4100 {
float n.input.leftOperand.sample[1]=1;
float n.input.rightOperand.sample[1]=1;
float n.output.result.sample[1]=2;

FIG. 41 n.train(500); — 4200
4202 — n.train(300);
n.train(200); — 4204

FIG. 42 n.result=n.compute(3,4); //n.leftOperand=3 and — 4300
4302 — n.rightOperand=4
n.result=n.compute(n.leftOperand=3, n.rightOperand=4); — 4304

FIG. 43

NN n;
4402 {
int n.input.leftOperand; //n.input ==1;
int n.input.rightOperand; //n.input ==2;
int n.output.result; //n.output ==1;
}

4404 {
float n.input.leftOperand.min=-10;
float n.input.leftOperand.max=10;
}
4408 — code n.input.leftOperand.behavior=loCode;

4406 {
float n.input.rightOperand.min=-10;
float n.input.rightOperand.max=10;
}
4410 — code n.input.rightOperand.behavior=roCode;

4412 {
float n.output.result.min=-50;
float n.output.result.max=50;
}
4414 — code n.output.result.behavior=resultCode;

4416 {
int n.hidden.hl1=5; //n.hidden ==1;
int n.hidden.hl2=3; //n.hidden ==2;
}

4418 {
code n.activationFunction=af; //code af; including the
derivative code
}

4420 {
float n.input.leftOperand.sample[1]=1;
float n.input.rightOperand.sample[1]=1;
float n.output.result.sample[1]=2;

float n.input.leftOperand.sample[2]=2;
float n.input.rightOperand.sample[2]=3;
float n.output.result.sample[2]=5;
}

4422 — n.train(500);

4424 {
n.output.result=compute(3,4); //n.input.leftOperand=3 and
n.input.rightOperand=4
n.output.result=compute(n.input.leftOperand=3,
n.input.rightOperand=4);
}

4426 — n.show();

```
4600 ──list 1 ;
4602 ──1=10;
4604 ──1=20;
4606 ──1=5;
        1[1] //will have the value of 10
        1[2] //will have the value of 20
        1[3] //will have the value of 5

4608 ── 1.size() will return the value 3.

4610 ── 1.find(20) //will return 2 which is equivalent to true
4612 ── 1.find(25) //will return 0 which is equivalent to false
```

```
                        4700
                         ↙
    list 1 ;
    1=10;  //1[1]=10;
4702 { 1=20;  //1[2]=20;
    1=5;   //1[3]=5;
    1.delete(25) //will return zero, and no action is taken.
          ⁄
        4704
```
FIG. 47

```
                        4800
                         ↙
    list 1 ;
    1=10;        //1[1]=10;
4802 { 1=20;        //1[2]=20;  ～4808
    1=5;         //1[3]=5;
4804 ⌒1.deleteIndex(4)  //will return zero, and no action is taken.
4806 ⌒1.deleteIndex(2)  //will return 20, which is equivalent to true,
                //and the item '20' is deleted from the list.
```
FIG. 48

```
                        4900
                         ↙
4902 ～list 1 ;
    1.push (10);   //1[1]=10;  ⎤
    1.push (20);   //1[2]=20;  ⎬ 4904
    1.push (5);    //1[3]=5;   ⎦
    //1(10, 20, 5)
4906 ～1.pop ();       //the return value is 5
    //1(10, 20)
    1.push (15);   //1[3]=15;
    1.push (25);   //1l[4]=25;
    1.push (35);   //1[5]=35;
    1.push (45);   //1[6]=45;
    //1(10, 20, 15, 25, 35, 45)
4908 ⌒1.pop (3); //the return value is 25
    //1(10, 20, 15)

1.pop(2); is equivalent to
    1.deleteIndex(1.zize());1.deleteIndex(1.zize());
```
FIG. 49

```
list 1;
1.enqueue(5);       ~ 5002
//1(5)
1.enqueue(15);      ~ 5006
//1(15,5)
1.enqueue(25);      ~ 5008
//1(25,15,5)
1.enqueue(35);
//1(35,25,15,5)
1.dequeue();    //the return value is 5    ~ 5004
//1(35,25,15)
1.dequeue();    //the return value is 15
//1(35,25)
1.dequeue();    //the return value is 25
//l(35)
1.dequeue();    //the return value is 35
//1(empty)
1.dequeue();
//1(empty)
```

```
list 1;
1=10;      //1[1]=10;
1=20;      //1[2]=20;    } 5102
1=5;       //1[3]=5;
1.top();      //the return value is 5
1.bottom();   //the return value is 10
```

5104 / 1.top();
5106 / 1.bottom();

```
list 1;                    ~ 5202
1.sorted=true;             ~ 5204
1.sorted.ascending=false;
1=10;
//1(10)
1=20;
//1(20, 10)
1=5;
//l(20, 10, 5)
1=15;
//1(20, 15, 10, 5)
```

5302
```
FL fl;
int fl.fuel;
float fl.distance;
float fl.speed;
```

5304
```
//FUEL
float fl.fuel.range.min=0;
float fl.fuel.range.max=100;
```

5306
```
//left and right edges
float fl.fuel.lineDown.low.min=20.0;
float fl.fuel.lineDown.low.max=30.0;
float fl.fuel.lineUp.high.min=70.0;
float fl.fuel.lineUp.high.max=85.0;
```

5308
```
//trapezoid
float fl.fuel.trapezoid.medium.min=20.0;
float fl.fuel.trapezoid.medium.peakL=40.0;
float fl.fuel.trapezoid.medium.peakR=60.0;
float fl.fuel.trapezoid.medium.max=80.0;
```

5310
```
//triangle
float fl.fuel.triangle.medium.min=20.0;
float fl.fuel.triangle.medium.peak=50.0;
float fl.fuel.triangle.medium.max=80.0;
```

5312
```
//Bell curve
float fl.fuel.bellCurve.medium.around=50.0;
float fl.fuel.bellCurve.medium.scale=0.1;
```

5314
```
//DISTANCE
float fl.distance.range.min=0;
float fl.distance.range.max=100;

//left and right edges
float fl.distance.lineDown.low.min=20.0;
float fl.distance.lineDown.low.max=70.0;
float fl.distance.lineUp.high.min=30.0;
float fl.distance.lineUp.high.max=80.0;
float fl.speed.range.min=0;
float fl.speed.range.max=100;

//left and right edges
float fl.speed.lineDown.low.min=20.0;
float fl.speed.lineDown.low.max=30.0;
float fl.speed.lineUp.high.min=70.0;
float fl.speed.lineUp.high.max=85.0;

//trapezoid
float fl.speed.trapezoid.medium.min=20.0;
float fl.speed.trapezoid.medium.peakL=40.0;
float fl.speed.trapezoid.medium.peakR=60.0;
float fl.speed.trapezoid.medium.max=80.0;

//triangle
float fl.speed.trapezoid.medium.min=20.0;
float fl.speed.trapezoid.medium.peak=50.0;
float fl.speed.trapezoid.medium.max=80.0;

//Bell curve
float fl.speed.bellCurve.medium.around=50.0;
float fl.speed.bellCurve.medium.scale=0.1;
```

5316
```
//fuzzy rules
if(fl.fuel...low or fl.distance...near)
fl.speed...low if(fl.fuel...medium and fl.distance...far)
fl.speed...medium if(fl.fuel...high and fl.distance...far)
fl.speed...high
```

5318
```
fl.fuel = 50;
fl.distance = 2.8;
```

5320
```
fl.speed = fl.compute();
```

//genes
5402 { int gn.gene.x;     //gn.gene==1
       int gn.gene.y;     //gn.gene==2

5404 {
//chromosomes
float gn.gene.x.chromosome[1]= 1;
float gn.gene.y.chromosome[1]= 4;

float gn.gene.x.chromosome[2]= 3;
float gn.gene.y. chromosome[2]= 9;

float gn.gene.x.chromosome[3]= 0;
float gn.gene.y. chromosome[3]= 7;
}

5406 — code gn.fitness = fitnessCode;
5408 — code gn.selection = selectionCode;
5410 — code gn.recombination = recombinationCode;

5412 — float gn.error= 0.01;
5414 — gn.evolve();
//gn.gene.x will return the values of x of the most fit chromosome;
//gn.gene.y will return the values of y of the most fit chromosome;

//gn.generation will contain the generation number needed in order to have an error
//less than 0.01

FIG. 54

```
/* some useful colors */

5502 {
color red       = rgb(255,0,0);
color brick     = rgb(128,0,0);
color green     = rgb(0,255,0);
color blue      = rgb(0,0,255);
color white     = rgb(255,255,255);
color cyan      = rgb(0,255,255);
color yellow    = rgb(255,255,0);
color magenta   = rgb(255,0,255);
color black     = rgb(0,0,0);
color lightgray = rgb(150,150,150);
color gray      = rgb(100,100,100);
color darkgray  = rgb(50,50,50);
color orange    = rgb(255,127,0);
color brown     = rgb(153,102,51);
color purple    = rgb(127,0,127);
```

// ---------- The Grid ----------      5506

```
              5504 {
function Grid(p1,p3,tint,step)
{
    color black = rgb(0,0,0);
    point p2;
    point p4;

select tint;

p3.z = p1.z;
    p2 = (p3.x,p1.y,p1.z);
    p4 = (p1.x,p3.y,p1.z);

if (!step) return;

int i;

for (i=0; i<p2.x; i+=step)
    {
        up (p1.x+i,p1.y,p1.z);
        dn (p1.x+i,p3.y,p1.z);
    } for (i=0; i<p4.y; i+=step)
    {
        up (p1.x,p1.y+i,p1.z);
        dn (p2.x,p1.y+i,p1.z);
    }
    select black;
}
```

// ---------- The Tree ----------
```
function tree(minH,maxH)
{
    push ro ((0,0,0),(1,0,0),90);
    int r = random(minH,maxH);
    int ttype = random(1,3);
    color greenee = rgb (0,random(128,255),0)
    color black = rgb (0,0,0);

select greenee;

if(r)
    {
        switch
        {
            case ttype == 1:
                    push tr(0,0,r+3);
                    push sc (0.6,1.5,0.6);
                    sphere (r,8,8);
                    pop(2);
            case ttype == 2:
                    push tr(0,0,r+1);
                    push sc (0.9,1.1,0.9);
                    sphere (r,8,8);
                    pop(2);
            case ttype == 3:
                    cone (r,r*2.5,16);
        }
    }
    select black;
    pop(1);
    return r;
}
```

```
              5508 {
function RowOfTrees(n,minH,maxH)
{
    int i = 0;
    int r;

push tr (0, 0, 0);
    while (i < n)
    {
        r = tree(minH,maxH);
        concat tr (1.1*r,0,0);
        i++;    5514
    }
    pop (1);
}
```

FIG. 55A

```
function PatchOfTrees(n,m,minH,maxH)
{
    int i = 0;

push tr (0, 0, 0);
    while (i < m)
    {
        RowOfTrees(n,minH,maxH);
        concat tr (0,maxH,0);
        i++;
    }
    pop (1);
}
```
5510

```
// main
clear;
//create and show window
window w (640,480);
w.backcolor=rgb(0,0,0);
select (w);
cls;
freeze (w);
show (w);
//call camera
camera cam;
cam.position = (-100,-90,45);
cam.target = (0,0,0);
select cam;

//show grid, publish forest
Grid((0,0,0),(100,100,0),yellow,10);

PatchOfTrees(10,10,1,10);
unfreeze w;

while (w);
```
5512

HUMAN BEHAVIORAL MODELING AND SIMULATION FRAMEWORK

RELATED PROVISIONAL APPLICATION

The present disclosure is related to and claims the benefit of priority of provisional U.S. Patent Application Ser. No. 60/892,422 entitled "Human Behavior Modeling and Simulation Framework", filed on Mar. 1, 2007, which is hereby incorporated by reference.

BACKGROUND INFORMATION

1. Field

The present disclosure provides an improved data processing system and in particular, a method and apparatus for processing data. Still more particularly, the present disclosure relates to a computer implemented method, apparatus, and computer usable program code for modeling and simulating human behavior.

2. Background

Human behavior is a collection of activities performed by human beings. These activities are influenced by factors, such as, for example, culture, attitudes, emotions, values, ethics, authority, persuasion, and/or coercion. The behavior of human beings falls within a range in which some behavior is common, some behavior is considered unusual, some other behavior is considered acceptable, and other behavior is outside of acceptable limits. The behavior of people has been studied by many academic disciplines, such as psychology, sociology, and anthropology. More recently, the use of computers have been applied to the study of human behavior.

Additionally, simulations of human behavior have been used perform military exercises and planning. Human behavior simulation also may be used with respect to predicting other situations, such as economic and social actions. An ability to predict human behavior would be useful in developing training programs. Knowing how trainees will respond do different stimuli may be used to develop and modify training programs.

Current models and simulation programs do not properly simulate human behavior for different reasons. As an example, currently available simulation programs are suited only for a particular type of simulation. As a result, when a different type of simulation is required, a new program is required to be written to perform that simulation. Additionally, the number of relations and the ability to modify those relations is limited.

Therefore, it would be advantageous to have an improved computer implemented method, apparatus, and computer usable program code for modeling and simulating human behavior for use in a training program.

SUMMARY

The advantageous embodiments provide a computer implemented method, apparatus, and computer usable program code for simulating human behavior. Source code is located on a storage system in a network data processing system. This source code is written in a language for predicting human behavior. An interpreter executes on hardware in the network data processing system, in which the interpreter includes a language interpreter and a communications module. The language interpreter executes a simulation with the source code using artificial intelligence to generate a new definition and interpreted source code. A graphical user interface processor executes on the hardware in the network data processing system. The graphical user interface processor receives the interpreted source code from the language interpreter to form received interpreted source code and generates device dependent output using the received interpreted source code. A set of devices is in communication with the graphical user interface processor. This set of devices displays the device dependent output, receives user input to form received user input, and sends the received user input to the graphical user interface processor. The communications module receives the received user input from the graphical user interface processor and the new definition from the language interpreter and modifies the source code with the received user input and the new definition to form modified source code that is executed by the language interpreter.

The advantageous embodiments also provide an apparatus with source code located on a storage system in a network data processing system. An interpreter executes in the network data processing system. The interpreter executes a simulation with the source code generating interpreted source code. The interpreter modifies the source code using the interpreted source code to form a feedback loop that results in modified source code that is executed by the interpreter. A graphical user interface processor executes in the network data processing system. The graphical user interface processor receives the interpreted source code from the language interpreter and generates device dependent output.

Another advantageous embodiment provides a computer implemented method for simulating human behavior. Data is retrieved from source code stored in a storage system in a network data processing system to form retrieved data. The retrieved data is interpreted to perform a simulation of the human behavior using an interpreter executing on the network data processing system to generate results. Device dependent data is generated from the results using a graphical user interface processor executing on the network data processing system. The device dependent data may be used to present the results. The source code is modified using the results to form modified source code. The modified source code provides new data utilized in subsequent interpretations to predict the human behavior.

In yet another embodiment, a computer implemented method is provided for predicting human behavior. A source code is received from a storage system by an interpreter to form retrieved source code. Actions are executed using the retrieved source code at the interpreter, wherein a definition modification occurs in response to executing the initial actions. The source code is modified in the storage system using the definition modification to form current source code. Subsequent actions are executed at the interpreter using the current source code to generate results. A continual feedback of new definition modifications is generated to continually modify the current source code being executed by the interpreter. The results are presented on a set of devices using a graphical user interface processor.

The advantageous embodiments also provide a computer program product having a computer usable medium that contains computer usable program code for simulating human behavior. The computer program product includes computer usable program code for retrieving data from source code stored in a storage system in a network data processing system to form retrieved data. In addition, computer usable program code is present for interpreting the retrieved data to perform a simulation of the human behavior using an interpreter executing on the network data processing system to generate results. Computer usable program code is used to generate device dependent data from the results using a graphical user interface processor executing on the network data processing system. The device dependent data may be used to present the results. Computer usable program code is present for modifying the source code using the results to form modified source code. The modified source code provides new data utilized in subsequent interpretations to predict the human behavior.

Another advantageous embodiment provides a data processing system for simulating human behavior. This data processing system includes retrieving means for retrieving data from source code stored in a storage system in a network data processing system to form retrieved data. Interpreting means are present for interpreting the retrieved data to perform a simulation of the human behavior using an interpreter executing on the network data processing system to generate results. The data processing system also includes generating means for generating device dependent data from the results using a graphical user interface processor executing on the network data processing system. The device dependent data may be used to present the results. Modifying means are present for modifying the source code using the results to form modified source code. The modified source code provides new data utilized in subsequent interpretations to predict the human behavior.

The features, functions, and advantages can be achieved independently in various embodiments of the present disclosure or may be combined in yet other embodiments.

BRIEF DESCRIPTION OF THE DRAWINGS

The novel features believed characteristic of the disclosure are set forth in the appended claims. The disclosure itself, however, as well as a preferred mode of use, further objectives and advantages thereof, will best be understood by reference to the following detailed description of an advantageous embodiment when read in conjunction with the accompanying drawings, wherein:

FIG. 3 is a diagram illustrating a simulation system in accordance with an advantageous embodiment;

FIG. 4 is a diagram of a human behavioral modeling and simulation development framework in accordance with an advantageous embodiment;

FIG. 5 is a diagram illustrating a distribution of modules in a framework in accordance with an advantageous embodiment;

FIG. 34 is a diagram of examples of input neurons in accordance with an advantageous embodiment;

FIG. 35 is a diagram of examples of input ranges defined for the input neuron left operand in accordance with an advantageous embodiment;

FIG. 36 is a diagram of a statement for input behavior in accordance with an advantageous embodiment;

FIG. 37 is a diagram illustrating an output declaration in accordance with an advantageous embodiment;

FIG. 38 is a diagram illustrating statements for output ranges in a neural network in accordance with an advantageous embodiment;

FIG. 39 is a diagram illustrating a statement for modifying output behavior in accordance with an advantageous embodiment;

FIG. 40 is a diagram illustrating statements for hidden layers in accordance with an advantageous embodiment;

FIG. 41 is a diagram illustrating a sample neural network in accordance with an advantageous embodiment;

FIG. 42 is example statements for training a neural network in accordance with an advantageous embodiment;

FIG. 43 is a diagram illustrating a compute function in a neural network in accordance with an advantageous embodiment;

FIG. 44 is a diagram illustrating an example of a neural network in accordance with an advantageous embodiment;

FIG. 47 is a diagram illustrating deleting a variable from the list in accordance with an advantageous embodiment;

FIG. 48 is a diagram of code for deleting items in accordance with an advantageous embodiment;

FIG. 49 is a diagram illustrating code to manipulate items in the list is depicted in accordance with an advantageous embodiment;

FIG. 50 is a diagram illustrating the use of the list as a queue in accordance with an advantageous embodiment;

FIG. 51 is a diagram illustrating reading items in the list in accordance with an advantageous embodiment;

FIG. 52 is a diagram illustrating a sort attribute in a list in accordance with an advantageous embodiment;

FIG. 53 is an example of a fuzzy logic implementation using fuel distance and speed in accordance with an advantageous embodiment;

FIG. 54 is a diagram illustrating the solving of an equation using a genetic algorithm in accordance with an advantageous embodiment; and FIGS. 55A and 55B are a diagram illustrating code for an object in source code in accordance with an advantageous embodiment.

DETAILED DESCRIPTION OF THE INVENTION

Figure 1:
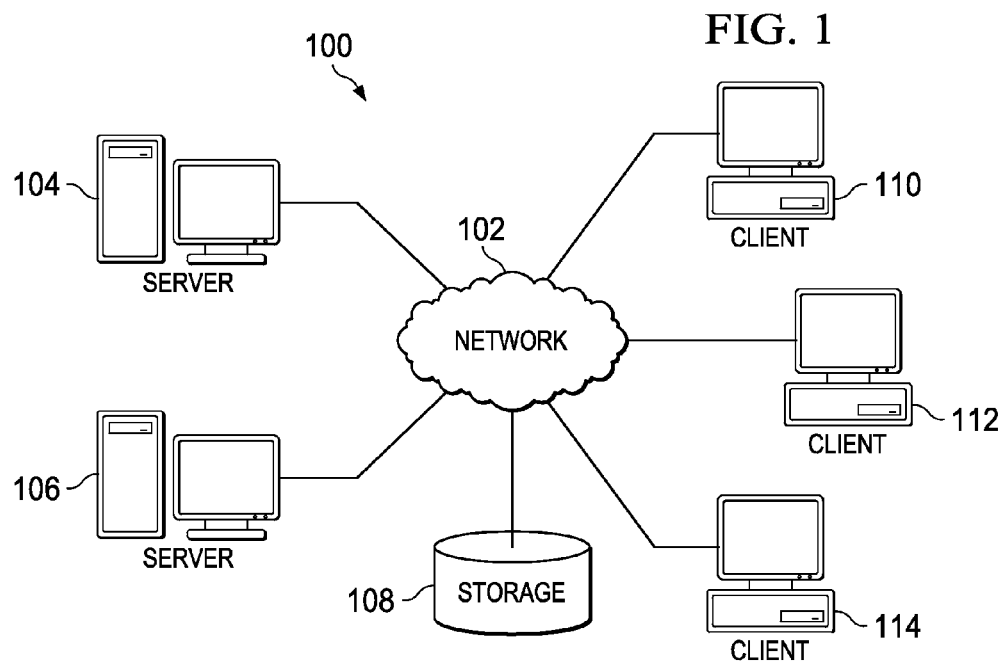
FIG. 1 is a pictorial representation of a network of data processing systems in which the advantageous embodiments may be implemented.
Figure 2:
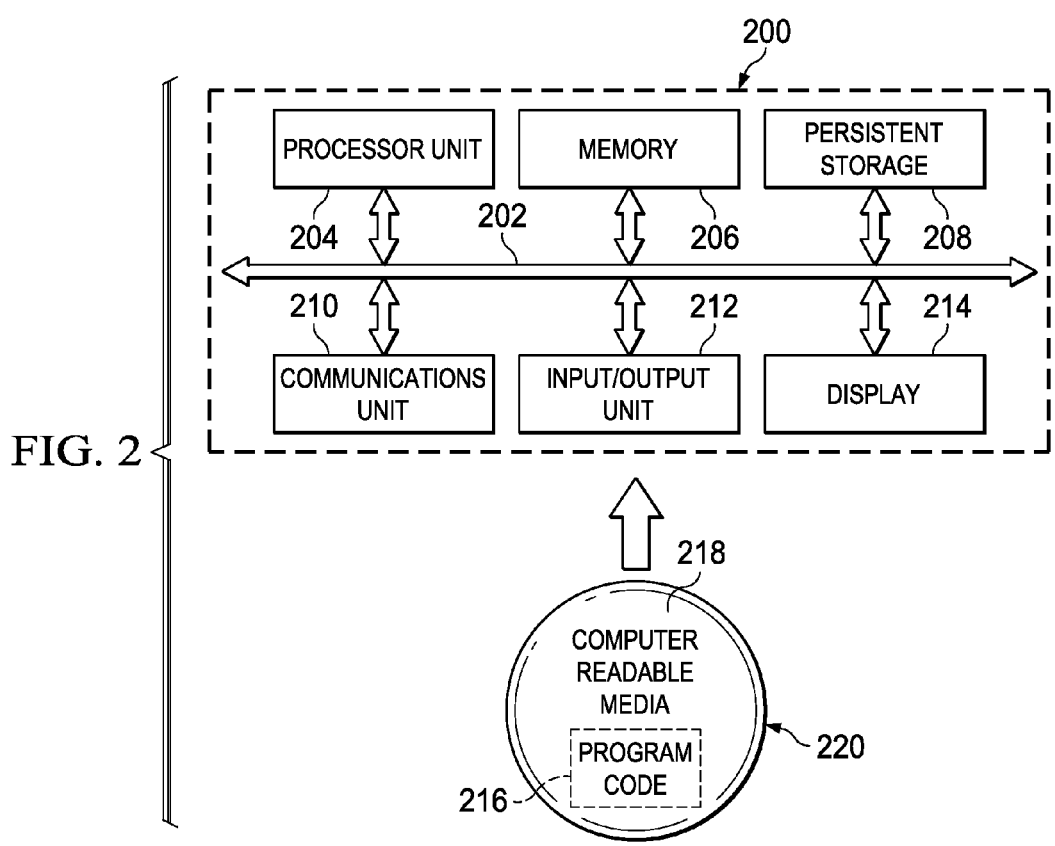
FIG. 2 is a diagram of a data processing system in accordance with an advantageous embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different advantageous embodiments may be implemented. Many modifications to the depicted environments may be made.

As used herein, the phrase "at least one of", when used with a list of items, means that different combinations one or more of the items may be used and only one of each item in the list is needed. For example, "at least one of item A, item B, and item C" may include, for example, without limitation, item A or item A and item B. This example also may include item A, item B, and item C, or item B and item C.

With reference now to the figures, FIG. 1 depicts a pictorial representation of a network of data processing systems in which the advantageous embodiments may be implemented. In these depicted examples, network data processing system 100 is used to implement a human behavioral modeling and simulation development framework. This framework provides an ability to predict human behavior.

Network data processing system 100 is a network of computers and other devices in which advantageous embodiments may be implemented. Network data processing system 100 contains network 102, which is the medium used to provide communications links between various devices and computers connected together within network data processing system 100. Network 102 may include connections, such as wire, wireless communication links, and/or fiber optic cables.

In the depicted example, server 104 and server 106 connect to network 102 along with storage unit 108. In addition, clients 110, 112, and 114 connect to network 102. These clients 110, 112, and 114 may be, for example, personal computers, workstations computers, and personal digital assistants. In the depicted example, server 104 provides data, such as boot files, operating system images, and applications to clients 110, 112, and 114. Clients 110, 112, and 114 are clients to server 104 and server 106 in this example. Network data processing system 100 may include additional servers, clients, and other devices not shown. The framework for predicting human behavior in the advantageous embodiments may be implemented using one or more data processing systems in network data processing system 100.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the depicted example, network data processing system 100 is the Internet with network 102, representing a worldwide collection of networks and gateways that use the Transmission Control Protocol/Internet Protocol (TCP/IP) suite of protocols to communicate with one another. Of course, network data processing system 100 also may be implemented as a number of different types of networks in addition to or in place of the Internet. These other networks include, for example, an intranet, a local area network (LAN), and a wide area network (WAN). FIG. 1 is intended as an example, and not as an architectural limitation for different embodiments.

Turning now to FIG. 2, a diagram of a data processing system is depicted in accordance with an advantageous embodiment. Data processing system 200 may be used to implement servers and clients, such as servers 104 and 106 and clients 110, 112, and 114 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As a client, data processing system 200 may take various forms. For example, data processing system 200 may take the form of a tablet computer, laptop computer, a work station, a personal computer, a telephone device, or a personal digital assistant (PDA).

The different embodiments provide a simulation environment that may be used to predict how a group of people may react individually and/or as a group when subjected to a series of actions and/or events. In this manner, different "what if" scenarios may be simulated with the results being used to help decision making on a final set of actions to be taken against the group.

The different embodiments provide a computer implemented method, apparatus, and computer usable program code for simulating human behavior. In one embodiment, source code is located in a storage system in a network data processing system, such as network data processing system 100 as shown in FIG. 1. The source code is used for predicting human behavior. An interpreter executes on hardware in the network data processing system. This interpreter executes the simulation with the source code to generate a new definition and interpreted source code. A graphical user interface processor executing on the hardware in the network data processing system receives the interpreted source code and generates device dependent output using this interpreted source code. The device dependent output is sent to a set of devices in communication with the graphical user interface processor. These devices display device dependent output and receive user input. Received user input is returned to the graphical user interface processor, which, in turn, sends the received user input to the interpreter. The interpreter uses the received user input and the new definition to alter or modify the source code. In these examples, a new definition is information used to modify existing source code or add new information to existing source code. This modified source code is then executed to generate new definitions and new interpreted source code. In this manner, the feedback loop is generated to change the source code in these advantageous embodiments.

Turning next to FIG. 3, a diagram illustrating a simulation system is depicted in accordance with an advantageous embodiment. System 300 is an example of a simulation system that may be implemented in network data processing system 100 in FIG. 1. In particular, system 300 may be implemented using one or more data processing systems, such as data processing system 200 in FIG. 2.

In these examples, definition 302 is processed by system 300 based on actions 304. Actions 304 are applied to definition 302 to perform the simulation of human behavior. Actions 304 may be selected by a user of system 300 in these examples. Actions 304 also may be selected from a configuration file or by a program or process. Definition 302 is part of the source code used for the simulation in these examples.

System 300 modifies definition 302 using actions 304 to generate definition 306. In these depicted examples, definition 306 is a new definition used as an output to provide results based on actions 304 taken on definition 302. Additionally, definition 306 is used to modify definition 302, which is then used to continue performing the simulation. This continual feedback occurs to provide system 300 an ability to learn from different iterations. Additionally, the results of previous simulations are stored in definition 302 allowing system 300 to learn from previous simulations.

In these examples, definition 302 is a representation of a group of humans and the environment in which the group of humans live. The description of the environment contains the assets, in both tangible and non-tangible form. Additionally, definition 302 also contains a description of the different humans that may populate the group in addition to internal relations that define actions and reactions to different events or input applied to the group of humans and the environment.

System 300 may be used as a simulation tool to predict the outcome and various reactions and/or impact when certain actions are taken against the group of humans described in definition 302. In other words, system 300 may be programmed to access impacts such as, for example, economic, social, and psychological, when actions 304 are applied or taken against definition 302. In the illustrative examples, definition 302 is written using a computer language. In the depicted examples, the computer language is an interpreted language, which uses an interpreter to execute the simulation, but does not require compiling for execution. Any language may be used that allows for defining various objects that are involved in a simulation process. For example, C and C++ are examples of interpreted languages that may be used in these examples. In these examples, the definition of objects include humans and the environments in which the humans live. The different advantageous embodiments provide a framework for system 300 as well as definition 302 and actions 304.

With reference now to FIG. 4, a diagram of a human behavioral modeling and simulation development framework is depicted in accordance with an advantageous embodiment. Framework 400 is an example of an architecture for system 300 in FIG. 3. In this example, framework 400 contains source code 402, interpreter 404, graphical user interface (GUI) processor 406, and devices 408.

Source code 402 is a module in framework 400 that contains all of the information for the database. Everything known about the simulation is stored in this particular component. Source code 402 contains all of the information needed to run a simulation. This information includes, for example, the definition for a group of humans and the code needed to execute the simulation using the definition. Source code 402 also includes actions that may be taken on the definition as well as code used to present the results.

The language used for source code 402 may be modified to include functions and features that are specific to simulating and predicting human behavior. The language with these features is referred to as Human Behavior Definition Language (HBDL). HBDL may be implemented using currently available languages such as C or C++. Of course, any interpreted language may be used to implement HBDL in these examples.

Further, HBDL may be implemented using an entirely new language rather than using an existing language with modifications to provide for simulating human behavior. In the illustrative embodiments, different languages may be used to implement different components of HBDL. In these examples, source code 402 is a database written in HBDL and may be distributed across different storage devices that may be located in different geographical locations.

Interpreter 404 collects data 410 from source code 402 to perform a simulation. In these illustrative examples, data 410 includes definitions of a group of humans and their environment, as well as actions that are to be applied to the humans. Further, data 410 also includes statements or lines from the programming language used to generate source code 402. These statements in data 410 are used by interpreter 404 to perform the simulation.

The statements in data 410 may include, for example, code for an artificial intelligence program to simulate a synthetic human. These statements also may include, for example, code for fuzzy logic, neural networks and other processes used to perform the simulation. In addition, data 410 also may include processes or code for generating a graphical user interface (GUI) to present the results. In this manner, source code 402 includes both the information regarding the group of humans and the environment as well as the processes or code needed to execute the simulation. Depending on the implementation, these statements may be in C or C++. Alternatively, the statements may be in a higher level language that interpreter 404 translates into C or C++ statements for execution.

This simulation generates graphics data 412, which is sent to GUI processor 406. In these examples, graphics data 412 is in a form that does not require large amounts of data transmission that may slow down a network. In the illustrative embodiments, graphics data 412 takes the form of primitives. By transmitting primitives, rather than bitmaps or other formats that require more data to be transferred, the amount of bandwidth used in the network is reduced. In some cases, it may be necessary to send some bitmaps in graphics data 412, but primitives are used when possible.

Instead, graphics data 412 is processed by GUI processor 406 to generate device data 414, which is displayed by devices 408. In these examples, device data 414 may be, for example, pixel data or bitmaps that are displayed by devices 408.

Devices 408 may also receive user input to generate device data 416, which is received by GUI processor 406. GUI processor 406 translates device data 416 into a format that requires less use of network resources for transmission. In these examples, user input 418 is returned to interpreter 404. User input 418 and results from the simulation from data 410 are used to generate modifications 420. Modifications 420 are used to overwrite or modify source code 402. These modifications are used to modify definitions in source code 402. Modifications 420 are similar to definition 306 in FIG. 3, which is used to modify definition 302 in FIG. 3. In this manner, source code 402 may be altered to take into account the results of the simulation performed by interpreter 404 and user input received from devices 408.

Modifications 420 also may include, for example, a selection of actions to be applied to or included in the simulation being performed by interpreter 404. This selection of actions and modifications 420 may be received from user input generated at devices 408 in these examples.

Data 410 may include information, such as definitions 302 and actions 304 in FIG. 3. Modifications 420 may include information, such as changes to definition 306 in FIG. 3. These changes may be, for example, modifications to existing definitions or the addition of new definitions. Graphics data 412 is used to present definition 306 in FIG. 3 in these examples.

The illustration of the different modules in framework 400 is not meant to imply architectural limitations to the manner in which these modules may be implemented. For example, the different modules may include different sub-modules or processes to implement the different features in framework 400. Also, a particular module may be implemented on a single data processing system or spread across multiple data processing systems.

With the modularity of framework 400, the different modules may be distributed to different locations across a network to maximize the use of hardware resources. This modularity in framework 400 also allows for the centralization of some functionality while allowing other functionality to be migrated or distributed to remote locations in a network data processing system. For example, placing graphics processing and device dependent data in a centralized environment and then sending this information over a network to remote device provides few advantages. Graphics data, in general, is large in size and may slow down a network. As a result, centralization of this type of information and processing introduces problems with respect to latency, data transmission and data synchronization. Framework 400 is designed such that implementations of framework 400 may avoid these problems.

With reference next to FIG. 5, a diagram illustrating a distribution of modules in a framework is depicted in accordance with an advantageous embodiment. In this example, the different modules illustrated in system 500 are from framework 400 in FIG. 4. As can be seen in this depicted example, system 500 contains internet 502, local area network (LAN) 504, wide area network (WAN) 506 and local area network (LAN) 508. These different networks are an example of components in network 102 in FIG. 1.

As depicted, source code 510 is found in storage device 512, 514, and 516. Storage device 512 is connected to local area network 504; storage device 514 is connected to wide area network 506; storage device 516 is connected to local area network 508. The distribution of source code 510 from different devices in different networks is an example of one manner in which source code 510 may be stored.

Source code 510 also may be stored on a single storage system on a particular network rather than across different locations. Some storage devices storing source code 510 may be backup devices that store duplicate copies of source code 510. With this implementation, it is possible to migrate portions of the system of other locations to leverage advantages that may be found in those locations, rather than limiting the implementation to a particular place.

Interpreter 518 is located on data processing system 520 in this example. Data processing system 520 may be implemented using a data processing system, such as data processing system 200 in FIG. 2. Data processing system 520 is connected to local area network 508. Interpreter 518 collects data from source code 510 in the different storage devices across the different networks to perform a simulation.

The results of the simulation are sent to GUI processor 522, which is also located on data processing system 520. GUI processor 522 generates device data for display on devices 523. Additionally, interpreter 518 may send graphics data to GUI processor 524 executing on data processing system 526 and GUI processor 528 executing on data processing 530. GUI processor 524 generates device data for display on devices 530, while GUI processor 528 generates device data for display on devices 532. GUI processors 522, 524, and 528 are located close to devices 523, 530, and 532, respectively.

In this manner, the data generated by these processors does not require the use of large amount of network resources. In these examples, the GUI processor module described in framework 400 in FIG. 4 is duplicated in several different locations within system 500 to minimize the use of transmitting graphics data over a network to remote device in a manner that may slow down or use large amounts of network resources.

Figure 6:
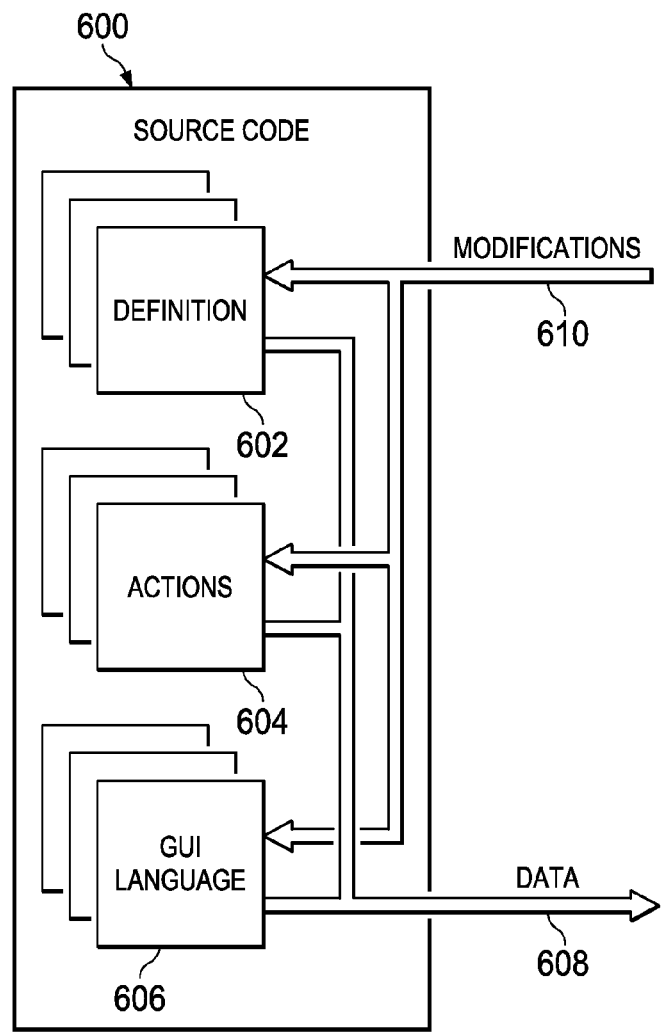
FIG. 6 is a diagram illustrating a source module code in accordance with an advantageous embodiment.

With reference now to FIG. 6, a diagram illustrating a source module code is depicted in accordance with an advantageous embodiment. In this example, source code 600 is a more detailed illustration of source code 402 in FIG. 4.

Source code 600 contains definition 602, actions 604, and graphical user interface (GUI) language 606. Definition 602 and actions 604 are directed towards the simulation of a group of humans in an environment. GUI language 606 is employed to present results and receive user input from the end user of the simulation. With GUI language 606, source code 600 controls the appearance of the presentation of results on the devices. This appearance of results is controlled using GUI language 606 in these examples.

Further, source code 600 is adaptive and open in these examples. Source code 600 includes both the information for the simulation and the actual language used to execute or perform the simulation. Source code 600 takes away decision making from a traditional application that reads and interprets a database. In contrast, source code 600 is a database that contains both the information and the application in which the information and application may be altered based on results generated through performing simulations.

Data 608 represents a flow of data to an interpreter, such as interpreter 404 in FIG. 4. Modifications 610 presents changes to source code 600 being received from the interpreter. Data 608 includes information from definition 602, actions 604, and GUI language 606 to the interpreter for use in performing the simulation. In these examples, source code 600 is a free format database.

In these illustrative examples, source code 600 is written in HBDL. As a free format database, source code 600 does not require success of separators between different components. A program within source code 600 may be written using a single line. Source code 600 also contains loops, case statements, conditional jumps, and other similar statements to alter the execution of the simulation.

Further, source code 600 contains objects, which store portions of code. As a result, objects may be called over and over without the need for repetitions. Further, within source code 600, objects may be indexed and defined to contain default parameters. In this manner, the creation of intelligent objects is enabled within source code 600.

Also, different types of variables may be defined within source code 600. These types of variables may be directed toward particular tasks. For example, in addition to conventional numerical types, source code 600 may include types, such as humans, persons, family, action, timeline, date, and others. Additionally, source code 600 provides a timeline based execution model for performing simulations. Artificial intelligence components may be provided within source code 600 along with function commands to support these components.

Within source code 600, definition 602 describes a group of humans and the environment in which the groups of humans live. Actions 604 represent influences that are applied to definition 602 during the simulation. In these examples, actions 604 are portions or snippets of code referred to as events that are put into a timeline.

In these examples, humans taking part in the simulation as well as humans using the simulation are handled by source code 600. The humans taking part in the simulation may be real or synthetic humans. Definition 602, actions 604, and GUI language 606 include functioning code as well as parameters. The functioning code and parameters along with other information are output as data 608 for interpretation by an interpreter.

By moving this information into source code 600, source code 600 is able to take control of the simulation. In this manner, the simulation is no longer application specific, like those written currently used styles and languages. For example, once a particular item is defined in definition 602, this item may be used with a predefined set of actions in actions 604. For example, a human of type X may be defined in definition 602 used along with actions run in actions 604. As a result, an infinite number of simulations may be created and run without recoding human X and run for each simulation.

Further, having GUI language 606 located within source code 600 means that definition 602 and actions 604 may control the display presented to users. In this manner, source code 600 is essentially a database that is in charge of what users of the simulation see. This feature also supports the reusability of definitions and knowledge to allow an infinite number of simulations to be created without having to custom write a simulation for application or program for each simulation.

Current systems employ data that is static in a single simulation that is coded from scratch. At best, the code that simulates a single object is kept in a library, but the action for each object is unique to each simulation. The action is typically written in a separate program. As a result, currently used techniques require substantial coding for each particular type of simulation. Further, with current practices, a graphical user interface is typically reused and in control of the application.

As a result, these interfaces do not change a particular simulation without having to recode or rewrite the application. In this manner, with the source code design in the advantageous embodiments, greater flexibility is presented to display results and receive user input in contrast to currently used techniques for simulations.

GUI language 606 provides code that is selectively sent by interpreter through a graphical user interface processor, such as GUI processor 406 in FIG. 4. This code provides the displays or visuals to the end user as well as input and output controls that are provided at various displays. GUI language 606 controls what every end user sees on their screens and the way every user interacts with the system. In these illustrative examples, GUI language 606 is a subset of HBDL. Depending on the particular implementation, GUI language 606 may be implemented using a different language to provide the different advantageous features. In this manner, the different advantageous embodiments show the control to source code 600.

An advantage of having the input and output controlled by GUI language 606 within source code 600 is that the user interface provided at the end devices may be controlled by the simulation. A simulation often involves users having different backgrounds. An ability to customize the various user interfaces helps these users to quickly understand the system. Thus, the learning curve for executing simulations is reduced. Further, only the most relevant information is presented to different users, which enhances the relevance of the simulation.

For example, different users may require different user interfaces for a particular simulation. Some users may be provided a user interface to select particular actions from actions 604 to apply to definition 602. Other users may be able to take the place of a synthetic human defined in definition 602. This type of user is provided a different user interface from the user that selects actions.

Further, different simulations being executed also require different types of interfaces. This type of architecture also provides an ability to dynamically add or simplify user interfaces. In this manner, user interfaces may be provided in an implementation dependent manner.

Additionally, different simulations may impose new parameters and new environments. These new and changing situations mean that different data sets are to be analyzed. These situations also may involve the need for different users or experts to be involved. This type of ever changing nature of the task at hand imposes a need for a versatile adaptive environment as provided through source code 600. Source code 600 provides this paradigm within definition 602, actions 604, and GUI language 606.

In these illustrative examples, the GUI processor is under the control of source code 600 and not a static application as currently occurs with presently used simulation systems. GUI language 606 provides a layer of abstraction for the hardware. The content of GUI language 606 ensures that the simulation process occurs in a predictable fashion and that appropriate information is delivered and received from a variety of users and devices. GUI language 606 contains all of the code needed to run on any hardware on which an interpreter and a GUI processor are implemented. In this manner, only lower layer portions that wrap around hardware need to be rewritten when hardware changes occur.

In these illustrative examples, GUI language 606 provides a variety of constructs to build necessary elements of a user interface during runtime. These elements include, for example, mouse tracking movement, mouse clicking movement, an analog joy stick, menus, windows, dialog boxes, check boxes, radio buttons, list boxes, and forms. With these and other elements, implementing a graphical user interface is made easier. Further, the output generated in building a graphical user interface using GUI language 606 may be saved within GUI language 606 for later uses.

GUI language 606 provides a number of different features to allow source code 600 to present and receive input with respect to a simulation of a group of people and the environment in which they are living in. GUI language 606 provides a set of three dimensional primitives. These three dimensional primitives support features such as a set of commands to control a hypothetical camera and view port. Mathematical functions, including vector and matrix operations, are also included along with an ability to import and export graphics file formats of different types.

The features provided within GUI language 606 also include creating three dimensional objects that embed more than just three dimensional data. For example, these three dimensional objects may include other information, such as, for example, price, weight, color, value, or rules regarding the three dimensional object. Of course, any kind of information may be imbedded or associated with these three dimensional objects.

Further, GUI language 606 also includes a three dimensional model and stack, and a set of commands to manage this model and stack. The three dimensional model and stack allows for a creation of complex transformations to be applied to different three dimension entities. In this manner, different worlds may be created in which objects are temporarily affected.

GUI language 606 provides for an easy creation and maintenance of large three dimensional databases. These databases may be found within definition 602. The databases may be used to represent any three dimensional object regardless of the size, complexity, or nature of the object.

Moreover, GUI language 606 provides a graphical user interface building language. This language allows source code 600 to control the look and feel of every end user device. GUI language 606 may include two dimensional primitives, such as points, lines, curves, and surfaces. Further, a set of two dimensional control objects also are present. These two dimensional control objects include, for example, windows, dialog boxes, requesters, check boxes, radio buttons, and menus.

Figure 7:
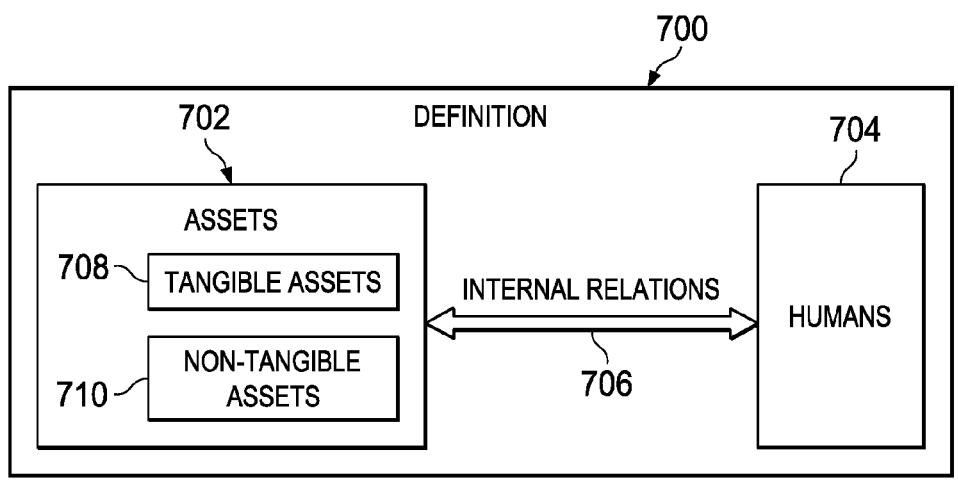
FIG. 7 is a diagram illustrating a definition portion of a source code in accordance with an advantageous embodiment.

With reference next to FIG. 7, a diagram illustrating a definition portion of a source code is depicted in accordance with an advantageous embodiment. Definition 700 is a more detailed illustration of definition 602 in FIG. 6. Definition 700 includes assets 702, humans 704, and internal relations 706.

Assets 702 includes both tangible assets 708 and non-tangible assets 710 in the environment in which the humans are present. Tangible assets 708 include both live and inanimate objects. Live objects may include, for example, livestock, birds, bacteria, and plants. Inanimate objects may include, for example, a house, a mountain, a lake, a car, a table, a pen, an aircraft, or a gun.

Non-tangible assets 710 may include, for example, rules, laws, and regulations for a group of humans being simulated. Non-tangible assets 710 may also include information used by the interpreter to handle the assets. This information also includes general code, libraries, and routines.

More specifically, this type of asset includes, for example, a math library, a graphics library, a two dimensional primitives library, a three dimensional primitives library, a model and stack management library, an artificial intelligence library, an input/output library, an encryption library, a networking library, a system calls library, and a time management library. In other words, non-tangible assets 710 may include any information needed to execute the simulation.

Humans 704 describe the various human characters that are present in a group of humans. Humans 704 may include information that details various family trees and relationships among the people in the group of humans. Further, humans 704 contain information needed to create psychological profiles for the various individuals.

Internal relations 706 contain actions and reactions that are used by the artificial intelligence in definition 700. These actions and reactions may be triggered in various manners. For example, the trigger may be random, alarm based, a state machine, or as a reaction to a set of events that are applied to definition 700.

Different objects within assets 702 may rely upon non-tangible assets 710 to perform necessary functions and computations. The general code, libraries, and routines are the code needed to support different programming tasks. These different components may be sent as data to an interpreter for use in executing a simulation. The three dimensional objects are all objects that make up the different world, including live and inanimate objects.

Figure 8:
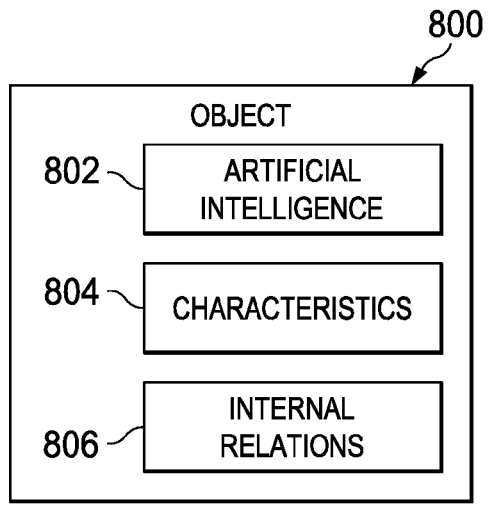
FIG. 8 is a block diagram of an object in accordance with an advantageous embodiment.

With reference now to FIG. 8, a block diagram of an object is depicted in accordance with an advantageous embodiment. In this example, object 800 is an example of one illustrative implementation of an object within definition 602 in FIG. 6. In this illustrative example, object 800 includes artificial intelligence 802, characteristics 804, and internal relations 806.

Artificial intelligence 802 contains code used to simulate a particular object. In these examples, object 800 is a living object, such as a human being, a plant, or an animal. Artificial intelligence 802 contains the code necessary to simulate the actions and reactions of the selected object.

Characteristics 804 include an identification of characteristics for the particular object. For example, if object 802 is a human, characteristics 804 may include, for example, height, weight, skin color, hair color, eye color, body build, and any other suitable characteristic of a person. Characteristics 804 may include other physical characteristics, such as, for example, how fast the person can run, the agility of the person, and the stamina of the person.

Non-physical characteristics in characteristics 804 may include, such as, for example, without limitation, patience, compassion, emotions, intelligence, and interpersonal relationships. Characteristics 804 are used by artificial intelligence 802 to simulate actions and reactions of object 800. In particular, characteristics 804 are used to simulate human behavior in the depicted examples.

The complexity of artificial intelligence 802 and the number of characteristics within characteristics 804 will vary depending on the particular implementation. The complexity of these components increase as the desired ability to make the simulation indistinguishable from real objects increases.

Internal relations 806 contains actions and reactions that may be used by artificial intelligence 802 to trigger events. These events include, for example, actions taken by object 800. These actions may be initiated by object 800, or the actions may be ones that occur in response to actions taken on object 800. These actions taken on by object 800 may be actions directed towards object 800 or may be ones that are perceived by object 800 based on the environment in which 800 is in during a simulation.

Figure 9:
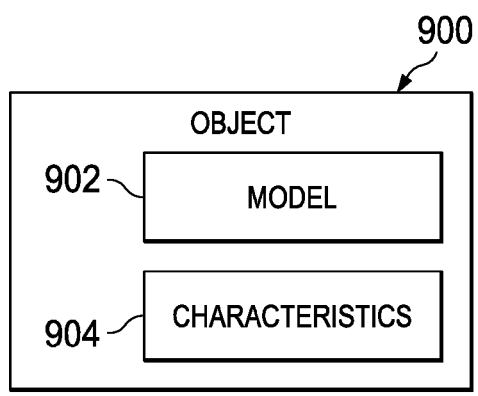
FIG. 9 is a diagram of an object in accordance with an advantageous embodiment.

Turning now to FIG. 9, a diagram of an object is depicted in accordance with an advantageous embodiment. In this example, object 900 is an example of an inanimate object that may be simulated with definition 602 in FIG. 6. Object 900 may be, for example, a car, a pen, an aircraft, a mountain, or a lake.

Object 900, in this example, includes model 902 and characteristics 904. Model 902 includes code that is used to simulate the particular object. Model 902 includes code to simulate the functions of the particular object. For example, if object 900 is a car, various actions may be performed on the car that generates certain results. For example, the engine may be turned on and the wheels may turn.

Model 902 may be, for example, a mathematical model. For example, set of finite state machines may be used to model the functions and operation of a car. Other functions and processes may be included in model 902, such as those to simulate aging of the object being modeled through use and exposure to environments over time.

Characteristics 904 identifies various characteristics of the car, such as, for example, tire size, engine size, paint color, type of radio, and amount of interior space. Further, characteristics 904 also may include other information about features of the car for object 900. For example, the amount of tread on a tire may be identified for the particular tire type within characteristics 904.

Model 902 is used to simulate what the car does in response to various actions taken on by object 900, such as a user driving the car, wear and tear that occurs on the tires identified in characteristics 904. This wear and tear is recorded within characteristics 904. The wear and tear may be part of an algorithm within model 902. Further, environmental exposure such as sun and hail may be taken into account by model 902 to present an aged look for model 902 in the car example. The different actions performed by object 800 in FIG. 8 and object 900 in FIG. 9 may be performed on these objects and may be defined within actions 604 in FIG. 6.

Figure 10:
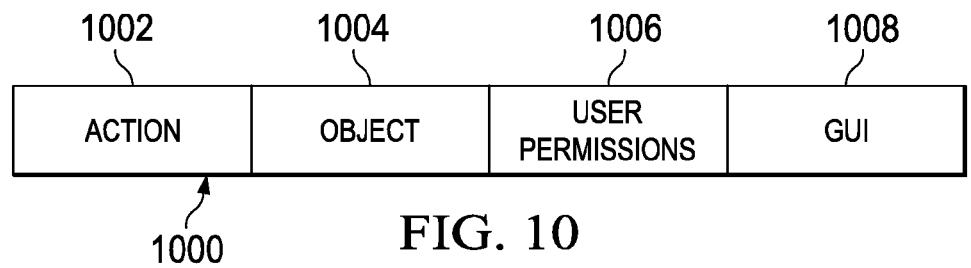
FIG. 10 is a diagram of an action object in accordance with an advantageous embodiment.

With reference now to FIG. 10, a diagram of an action object is depicted in accordance with an advantageous embodiment. In this example, action object 1000 is an example of an action that may be found within actions 604 in FIG. 6.

Action object 1000 includes action 1002, object 1004, user permissions 1006, and graphical user interface (GUI) 1008. Action 1002 may be, for example, an action that may be performed, such as talk, strike, move, sit, grasp, speak, or look. Object 1004 is an identification of the object in which the action may be taken. User permissions 1006 determines whether the particular user may perform action 1002 on object 1004. Graphical user interface 1008 identifies the type of user interface that is presented to a particular user.

Object 1004 may be an inanimate object or a live object. User permissions 1006 are used to determine whether certain users are able to perform selective actions on an object. In some cases, it is undesirable for a particular user to perform an action on an object. Graphical user interface 1008 identifies the manner in which the action on the object is presented to the user as well as how user interactions with the object may occur.

The illustrations of objects in FIGS. 8, 9, and 10 are presented for purposes illustrating one manner in which source code 600 in FIG. 6 may be implemented using currently available programming languages and methodologies. These examples, however, are not meant to imply limitations on the manner in which source code 600 in FIG. 6 may be implemented.

Figure 11:
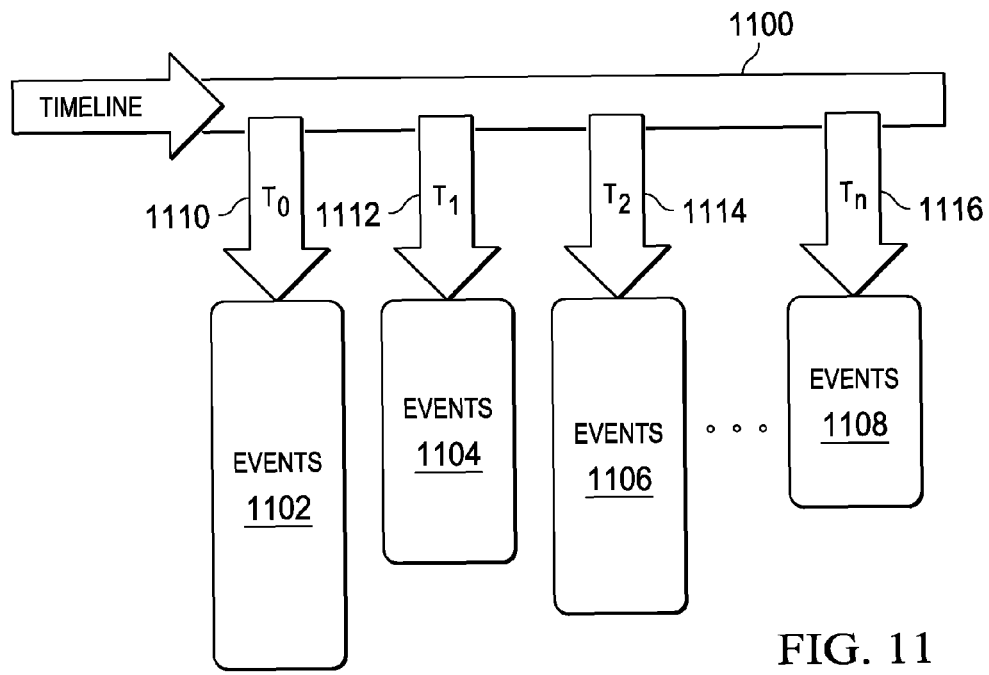
FIG. 11 is a diagram illustrating the application of actions in accordance with an advantageous embodiment.

Turning now to FIG. 11, a diagram illustrating the application of actions is depicted in accordance with an advantageous embodiment. In these examples, timeline 1100 illustrates influences that a definition, such as definition 602 in FIG. 6, is subjected to during a simulation. In these illustrative examples, actions such as actions 604 in FIG. 6 are referred to as events on timeline 1100. These actions are snippets or portions of code. In particular, the actions include events 1102, events 1104, events 1106, and events 1108. In this example, events 1102 are applied at time slot 1110. Events 1104 occur during time slot 1112 and events 1106 are applied during time slot 1114. Events 1108 occur during time slot 1116. These events may be procedural in nature or event driven. In other words, the events may be applied in response to various messages emitted or generated by the interpreter.

In these examples, a master interrupt issued by the execution of timeline 1100 interrupts these events during mid-execution, if necessary, and the simulation passes immediately to the next time slot of the simulation. Unlike currently used program languages, in which the execution of source code is either procedural or event driven, the actions in the source code follow a time-based execution model in the advantageous embodiments. In these examples, the time slots may have various granularities. For example, each time slot may represent a week, a day, an hour, a minute, or some other period of time.

In the depicted embodiments, timeline 1100 runs under the supervision of a scheduler, which is described in more detail below. The scheduler runs events 1102, 1104, 1106, and 1108, which are associated or attached to timeline 1100. The scheduler has full control over these events and may interrupt them as necessary. Further, the scheduler runs a memory manager and a memory recovery facility. In this manner, all memory allocated for an interrupted task may be made available to upcoming events.

Figure 12:
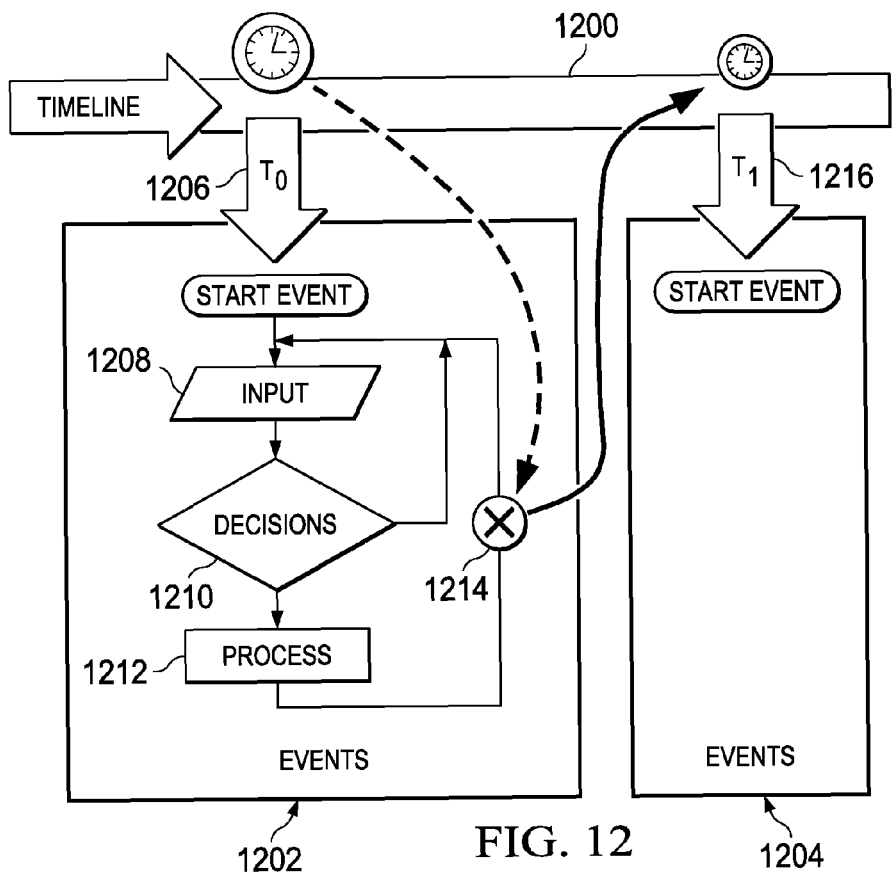
FIG. 12 is a diagram illustrating the application of actions on a timeline with a scheduler interrupt in accordance with an advantageous embodiment.

Turning now to FIG. 12, a diagram illustrating the application of actions on a timeline with a scheduler interrupt is depicted in accordance with an advantageous embodiment. In this example, timeline 1200 includes events 1202 and events 1204. Events 1202 begins executing during time slot 1206 on timeline 1200. In this example, events 1202 includes input 1208, decisions 1210, and process 1212. Events 1202 begins execution during time slot 1206. When time slot 1206 ends, the scheduler interrupts the execution of events 1202 at point 1214. Execution then is transferred to events 1204 for time slot 1216, which begins after time slot 1206. In this example, no overlap is present between time slot 1206 and time slot 1216.

Figure 13:
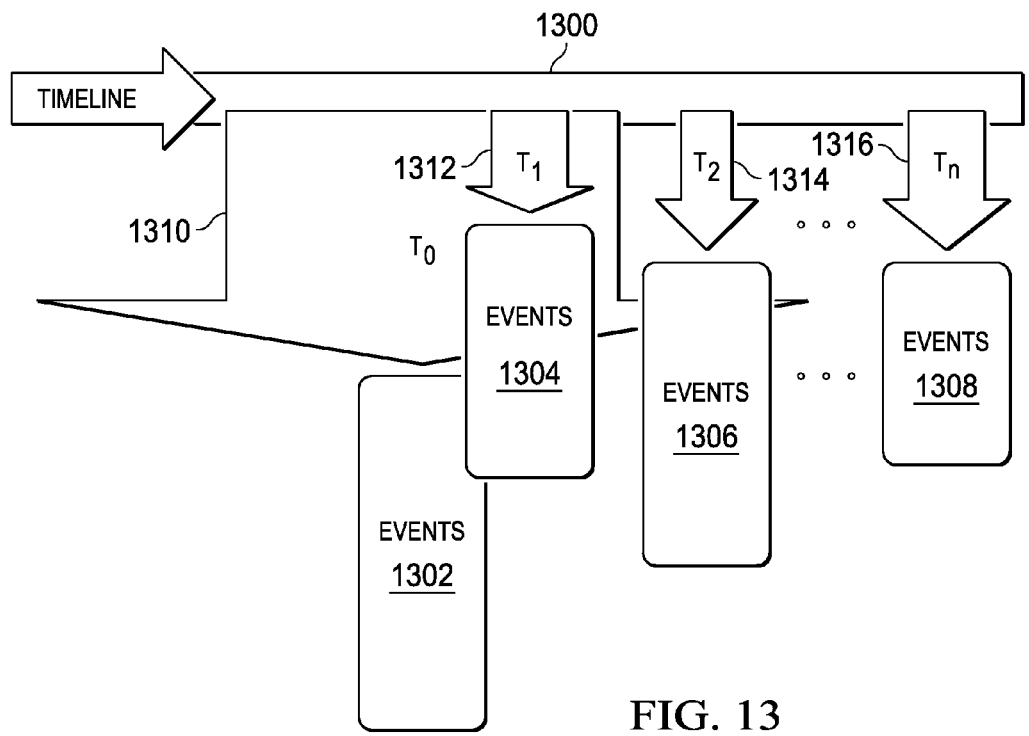
FIG. 13 is a diagram illustrating the application of events in which time slots overlap in accordance with an advantageous embodiment.

Turning next to FIG. 13, a diagram illustrating the application of events in which time slots overlap is depicted in accordance with an advantageous embodiment. In this example, the scheduler executes timeline 1300, which has events 1302, 1304, 1306, and 1308 attached to various time slots. Events 1302 are attached to time slot 1310. Events 1304 are attached or associated with time slot 1312. Events 1306 and 1308 are attached to time slots 1314 and 1316, respectively.

In this illustrative example, the different time slots may overlap with each other. In other words, one time slot may last for a longer period of time than another time slot. As illustrated, time slot 1310 and time slot 1312 overlap with each other. As a result, events 1302 and events 1304 may run concurrently during a certain period of time, in which time slots 1310 and time slots 1312 overlap. In this particular example, events 1302 are provided with more time to execute.

The overlapping of time slots does not mean that events are merged during the moment of time in which the overlap occurs. In these illustrative examples, if for any reason an interrupt of events 1302 for time slot 1310 occur, control passes to time slot 1312 if this interrupt occurred before the start of or during the execution of time slot 1312. If, however, the interrupt occurred during time slot 1310, but after the end of time slot 1312, control is passed to the execution of events 1306 in time slot 1314.

Figure 14:
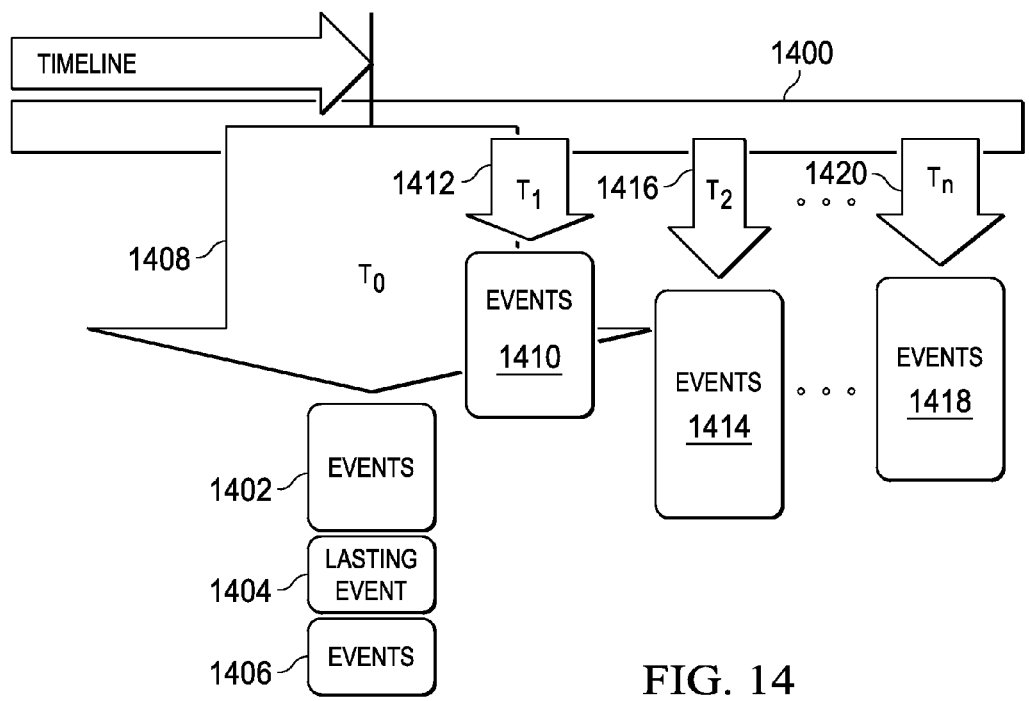
FIGS. 14, 15, and 16 are diagrams illustrating lasting events in accordance with an advantageous embodiment.
Figure 15:
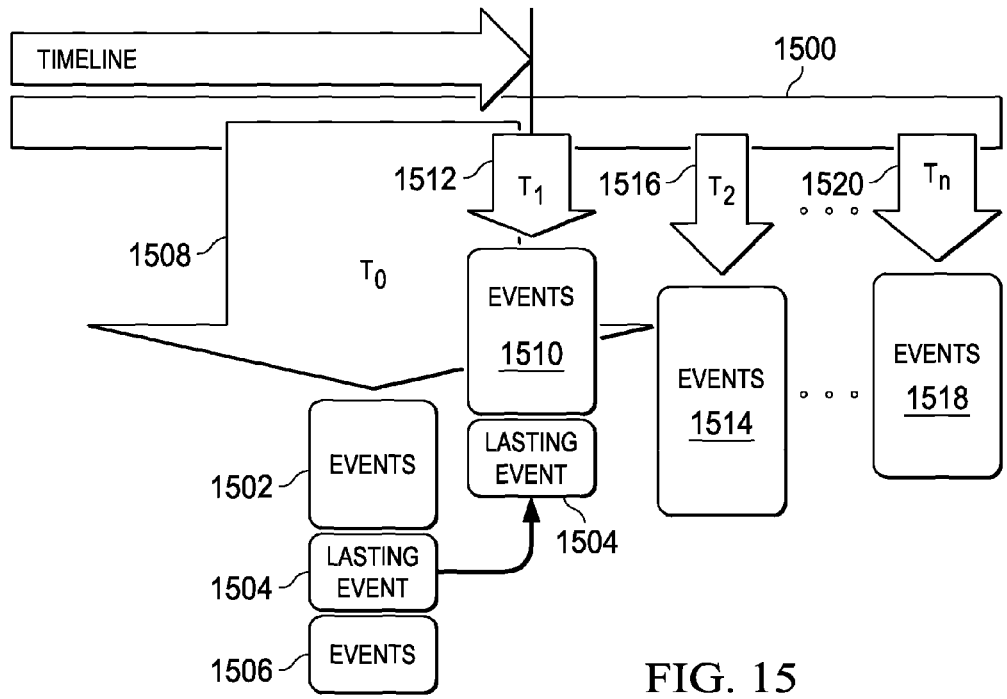
Figure 16:
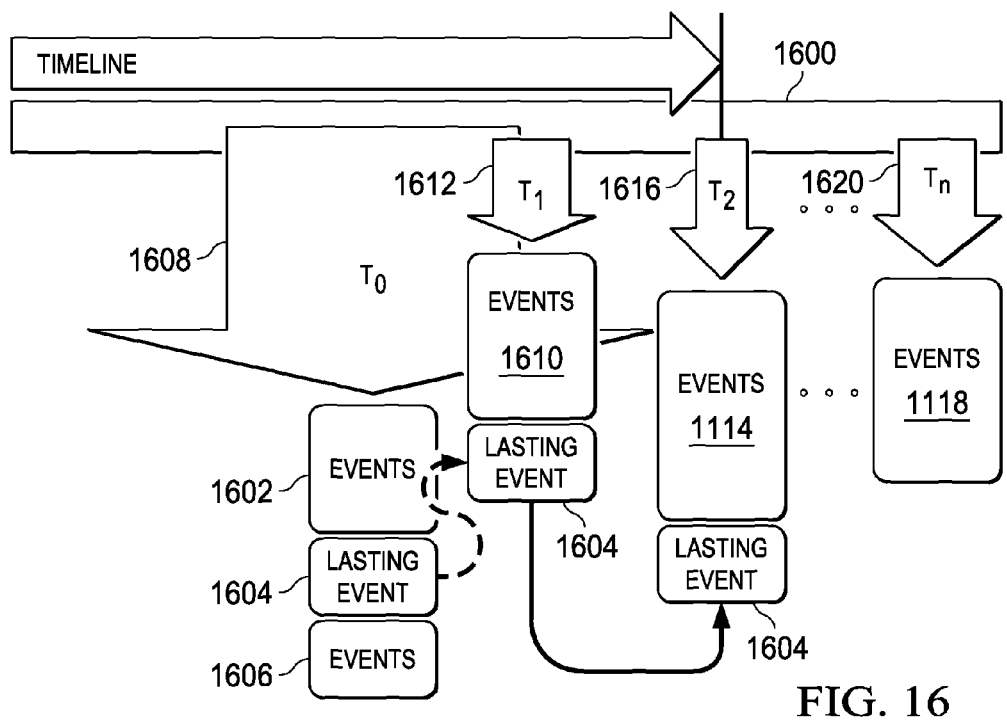

With reference now to FIGS. 14, 15, and 16, diagrams illustrating lasting events are depicted in accordance with an advantageous embodiment. As illustrated, timeline 1400 contains events 1402, lasting event 1404, and events 1406, which are attached to or assigned to time slot 1408. Events 1410 are associated with time slot 1412 on timeline 1400. Events 1414 are attached to time slot 1416, while events 1418 are attached to time slot 1420. Events may be made uninterruptible or given extensions. This type of event may be present when waiting for an input coming from an end user or from some other event that has not yet terminated but is needed. In these examples, this type of event is a lasting event, such as lasting event 1404. Lasting event 1404 may be carried over from one time slot to another time slot until the event fully occurs.

As illustrated in FIG. 15, lasting event 1404 becomes attached to time slot 1412. In FIG. 16, lasting event 1404 is again extended or moved to time slot 1416. Lasting event 1404 is completed during this particular time slot in these examples.

Figure 17:
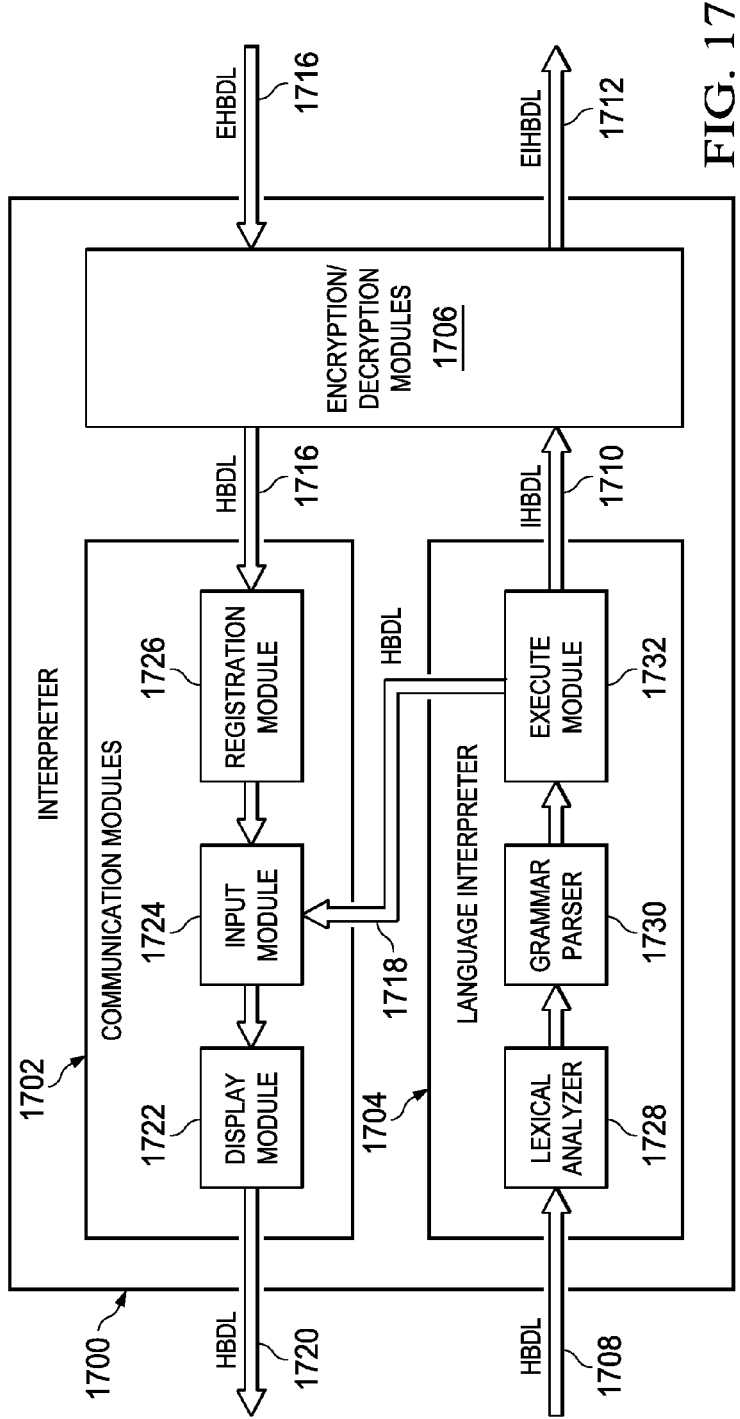
FIG. 17 is a diagram illustrating an interpreter in accordance with an advantageous embodiment.

Turning now to FIG. 17, a diagram illustrating an interpreter is depicted in accordance with an advantageous embodiment. Interpreter 1700 is a more detailed illustration of interpreter 404 in FIG. 4. Interpreter 1700 is a program that transforms a source code written in one language into a target code written in another language. Interpreter 1700 also executes the target code as the interpreter proceeds in processing the source code. This target language may be written in another high-level language or in the language used by the particular data processing system or processor.

For any program to be correctly interpreted and executed, the source code is structured according to constructs defined by the language. In particular, these constructs are syntactical constructs. The complete set of constructs forms the grammar of the language for the source code. Any code that is not structured according to these constructs or is grammatically incorrect is discarded by interpreter 1700.

Interpreter 1700 includes communication modules 1702 and language interpreter 1704. Additionally, interpreter 1700 includes encryption/decryption modules 1706, which provide for secure sending and receiving of information between interpreter 1700 and a GUI processor, such as GUI processor 406 in FIG. 4.

In these illustrative examples, language interpreter 1704 receives HBDL 1708. HBDL 1708 is an example of data, such as data 410 in FIG. 4 received from a source code module, such as source code 402 in FIG. 4. HBDL 1708 is interpreted by language interpreter 1704 to execute a simulation. The results are interpreted HBDL (IHBDL) 1710, which are sent to encryption/decryption module 1706 for encryption. After encryption, the encryption results are sent as encrypted interpreted HBDL (EIHBDL) 1712 to the GUI processor, such as GUI processor 406 in FIG. 4. EIHBDL 1712 is an example of graphics data 412 in FIG. 4. User input is received as encrypted HBDL (EHBDL) 1714 as collected by a GUI processor from a set of devices. EHBDL 1714 is an example of user input 418 in FIG. 4. This encrypted information is decrypted and sent to communication modules 1702 as HBDL 1716.

HBDL 1716 is an example of user input that is used to modify the source code. This modification may be, for example, changing definitions within the source code or to select actions to be applied to the definitions. Additionally, the output of language interpreter 1704 is sent to communications module 1702 as HBDL 1718 for use in modifying the source code. HBDL 1716 and HBDL 1718 are used by communication modules 1702 to form HBDL 1720, which is used to modify the source code. HBDL 1720 is an example of a format for modifications 420 in FIG. 4, which are used to modify the source code. As can be seen, HBDL 1718 provides a feedback for the output generated by language interpreter 1704 to modify the source code.

More specifically, communication modules 1702 includes dispatcher module 1722, input module 1724, and registration module 1726. Language interpreter 1704 includes lexical analyzer 1728, grammar parser 1730, and execute modules 1732.

Language interpreter 1704 contains modules that deal with lexical analysis, grammar parsing, and decision making.

When data is received as HBDL 1708, lexical analyzer 1728 dissects the data in HBDL 1708 into individual tokens or words in the source code language. In these illustrative examples, the source code is written in HBDL. In other words, lexical analyzer 1728 identifies the different tokens or components in HBDL 1708. These tokens are sent to grammar parser 1730 which groups the tokens into meaningful sentences or statements for HBDL 1708. Once a sentence or statement in HBDL 1708 is constructed, grammar parser 1730 sends this statement to execute module 1732. Action based on this statement is then accordingly taken.

Execute module 1732 includes a number of different sub-modules for performing simulations. In these examples, execute module 1732 generates interpreted HBDL (IHBDL) 1710 and HBDL 1718. HBDL 1710 takes the form of graphics data, such as graphics primitives. HBDL 1718 is a modified or new definition that is used to modify the source code. HBDL 1718 is returned to input module 1724 for use in modifying or rewriting the source code. Input module 1724 passes the new definition in HBDL 1718 to dispatcher module 1722 which dispatches HBDL 1720 to be written into the source code.

In these illustrative embodiments, grammar parser 1730 launches lexical analyzer 1728 and execute module 1732. Grammar parser 1730 requests tokens from lexical analyzer 1728. Lexical analyzer 1728 receives characters from HBDL 1708 to generate tokens. Each time a token is generated, lexical analyzer 1728 sends the token to grammar parser 1730. Grammar parser 1730 generates one or more parse trees using the token. When a parse tree is completed, grammar parser 1730 requests an action to be executed by execute module 1732 based on the completed parse tree.

In these illustrative examples, each parse tree represents a production. A production has a set of one or more actions that are fired or executed each time a stream of tokens matches a definition for a production. In response to the request from grammar parser 1730, execute module 1732 performs a semantic analysis to determine whether any semantic errors are found in the instructions for the actions. If an error occurs, the error is reported. Otherwise, the instructions for the set of actions are executed. A recursive return to non-terminal callers is made with actions being fired for the assigned completed productions along the way.

In these examples, execute module 1732 determines whether the instructions generated in the parse trees created by grammar parser 1730 are semantically correct. If semantic errors occur, execution module 1732 generates an error and ignores the instruction in these examples. In some cases, however, the errors may be corrected if enough information is present for execute module 1732 to make corrections.

When user input is received as EHBDL 1714, encryption/decryption modules 1706 decrypt the information to form HBDL 1716. HBDL 1716 is the user input in an un-encrypted form of HBDL, which is received by registration modules 1702. Registration module 1726 registers and validates each of the users that return user input. This registration module ensures that only authorized or registered users are allowed to return input into the system. For example, registration module 1726 may validate the password for a particular user.

Once a user is validated, the user input in HBDL 1716 is passed on to input module 1724. Input module 1724 acts as a focal point to centralize all forms of input and send the input with specific instructions to dispatcher module 1722. Input module 1724 may add instructions needed by dispatcher module 1722 to process the input. The input defines what to change in the source code in these examples.

The specific instructions include instructions, such as, instructions regarding what portions of the source code can be modified by a particular user in these examples. For example, if the user input modifies a definition, the instruction tells what portion of the source code is to be modified. The portion of the source code to be modified by the input may be identified using the identification of the user generating the input and the input itself.

Then, dispatcher module 1722 ensures that the appropriate section of source code is rewritten when HBDL 1720 is sent back to the source code. Dispatcher module 1722 determines whether to write to the source code using a policy with the identification of the user, the input, and the portion of the source code to be written. The policy is a set of rules used to determine whether writes should be made to the source code in response to the input. This policy provides a redundancy to prevent cases in which an unauthorized user may get past registration module 1726. For example, an unauthorized user may spoof a real user and submit input. The policy may identify the input as changes that are not to be made by the real user or not characteristic of the input made by the real user. In this case, the input is rejected by dispatcher module 1722.

In these examples, each user has their own set of actions that the user may add to or modify. As a result, users can only modify the action segment of the source code. The output, HBDL 1718, from execute module 1732, may be used to rewrite the definitions as well as actions. In these examples, language interpreter 1704 is also considered another user in the system. The interpreter, however, is a permanently authenticated user. Dispatcher module 1722 sees language interpreter 1704 as such to rewrite definitions using HBDL 1718.

As a result, at any given point of the simulation, a real human end user may replace any defined human in the database. Through this data flow, interpreter 1700 may rewrite or alter the source code. As time passes and simulations are run, definitions are constantly being generated for rewriting the source code.

Input module 1724 provides a connection between the "virtual world" being executed in the simulation and the "real world" as being received through user input by users at devices in communication with the system. Dispatcher module 1722 provides a mechanism to write new definitions to modify the source code.

Figure 18:
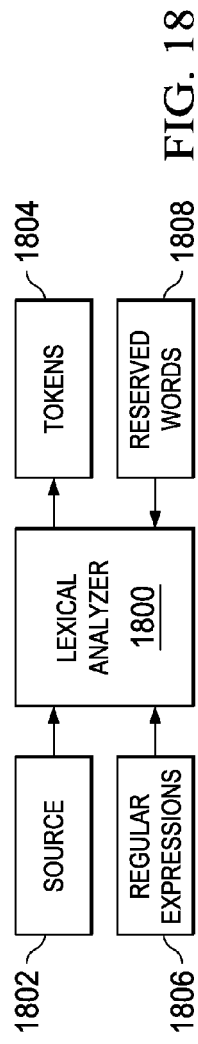
FIG. 18 is a diagram illustrating the data flow for a lexical analyzer in accordance with an advantageous embodiment.

Turning next to FIG. 18, a diagram illustrating the data flow for a lexical analyzer is depicted in accordance with an advantageous embodiment. As illustrated, lexical analyzer 1800 receives source 1802 and processes source 1802 to generate tokens 1804. Lexical analyzer 1800 is an example of lexical analyzer 1728 in FIG. 17. Lexical analyzer 1800 reads the content from source 1802 character by character and groups the incoming characters from source 1802 into basic units referred to as tokens, such as tokens 1804.

The grouping of characters in source 1802 into tokens 1804 is performed in these illustrative examples using a set of token descriptions in regular expressions 1806. Regular expressions 1806 contains the descriptions needed to group characters in source 1802 into tokens 1804. In these examples, regular expressions 1806 may be implemented using scripts. These scripts use symbols of a language that describes character patterns for use in grouping characters into tokens.

Each regular expression defined in regular expressions 1806 is assigned a symbol. This symbol typically is a number. The token generated in tokens 1804 by lexical analyzer 1800 is identified using the symbol for the particular regular expression in regular expressions 1806.

In addition to regular expressions 1806, lexical analyzer 1800 also uses reserved words 1808. Words within reserved words 1808 also are assigned a symbol when a token is identified within source 1802. A reserved word is a word that has special grammatical meaning to a language and cannot be used as an identifier in that language.

Figure 19:
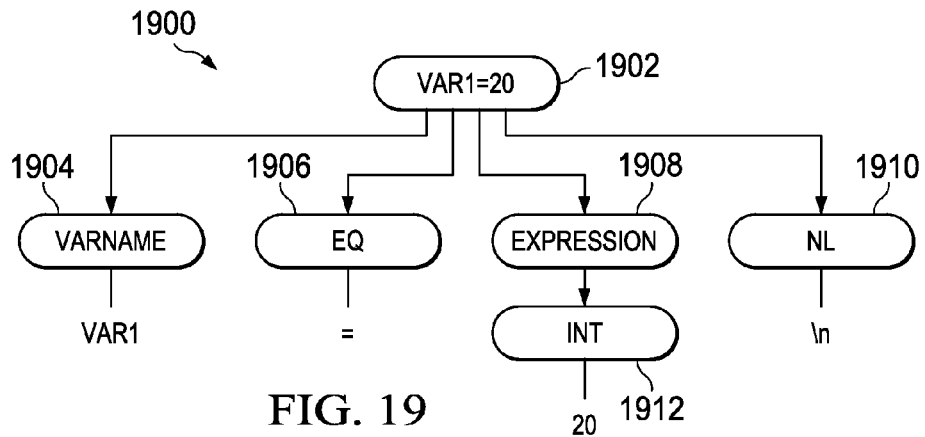
FIG. 19 is a diagram illustrating parsing or syntax analysis performed by a grammar parser in accordance with an advantageous embodiment.

Turning now to FIG. 19, a diagram illustrating parsing or syntax analysis performed by a grammar parser is depicted in accordance with an advantageous embodiment. The parsing illustrated in FIG. 19 may be performed by grammar parser 1730 in FIG. 17. Tree 1900 is an example of a parse tree that may be used by a grammar parser to group tokens. In this example, parsing of statement 1902 is illustrated. Statement 1902 is var1=20. This statement is used to manage or define actions to be carried out by the interpreter.

In particular, the grammar parser identifies relationships between tokens produced by the lexical analyzer based on a set of syntactic constructs also called productions. Each production represents a logical unit and is typically defined in terms of tokens in other logical units. Most languages define two broad types of logical units. These logical units are statements and expressions in these examples. Expressions are usually syntactic language constructs that provide values. Statements are syntactic constructs that change the state of variables, control the flow of the program, or perform other operations supported by the language.

The grammar parser groups the stream of tokens into logical units and instructs the execute module to execute actions based on the logical units. In this example, statement 1902 contains a stream of tokens produced by the lexical analyzer. These tokens are varname 1904, EQ 1906, expression 1908, and NL 1910. Expression 1908 contains an integer, INT 1912. The value for varname 1904 is var1; the value for EQ 1906 is =; the value for INT 1912 is 20; and the value for NL 1910 is \n. As can be seen, given a stream of tokens, the grammar parser regenerates the grammar based on the sequence of tokens in the stream.

Figure 20:
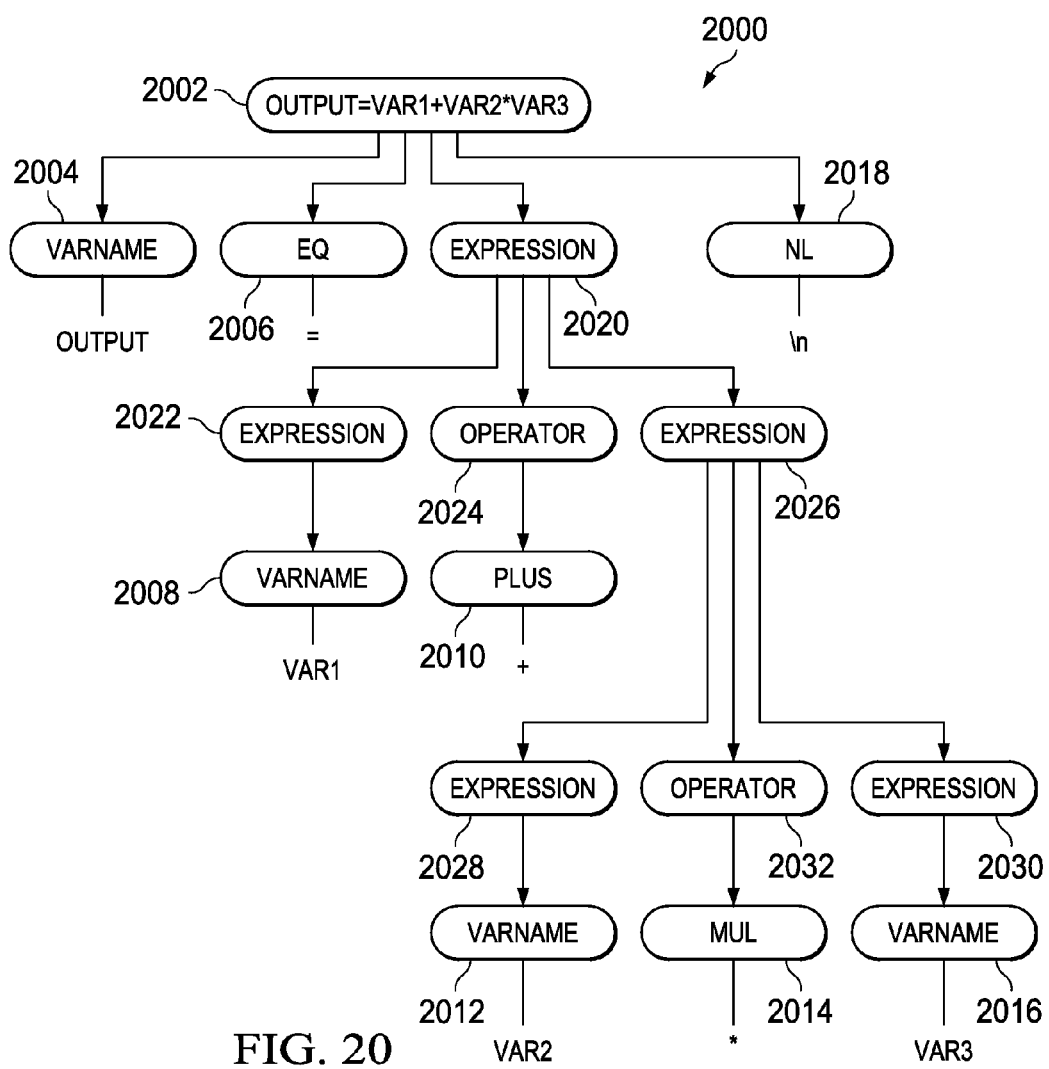
FIG. 20 is a diagram illustrating another example of a parse tree in accordance with an advantageous embodiment.

Turning now to FIG. 20, a diagram illustrating another example of a parse tree is depicted in accordance with an advantageous embodiment. In this example, parse tree 2000 is generated from statement 2002. Statement 2002, in this example, is output=var1+var2*var3.

In this example, tokens for statement 2002 include varname 2004, EQ 2006, varname 2008, plus 2010, varname 2012, MUL 2014, varname 2016, and NL 2018. Varname 2004 has a value output; EQ 2006 has a value =; varname 2008 has a value var1; plus 2010 has a value +; varname 2012 has a value var2; MUL 2014 has a value *; varname 2016 has a value var3; and NL 2018 has a value \n. The expression on the other side of the = sign for statement 2002 is defined by tokens varname 2008, plus 2010, varname 2012, MUL 2014, and varname 2016.

The identification of these expressions and their usage in the language is indicated within parse tree 2000 through the location of these tokens with respect to identifying nodes. For example, expression 2020 indicates that expressions 2022 and 2026 are operated upon using operator 2024. In this case, operator 2024 is plus 2010. Expression 2020 also includes expression 2026, which identifies expressions 2028 and 2030 as being operated upon using operator 2032. In this example, expression 2022 contains varname 2008, while expression 2026 includes the results of applying operator 2032 to expressions 2028 and 2030.

Figure 21:
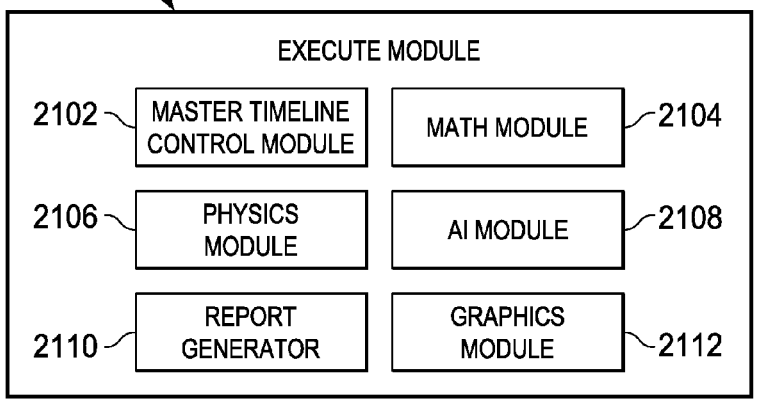
FIG. 21 is a diagram of a execute module in an interpreter in accordance with an advantageous embodiment.

Turning now to FIG. 21, a diagram of a execute module in an interpreter is depicted in accordance with an advantageous embodiment. In this example, execute module 2100 is a more detailed illustration of execute module 1732 in FIG. 17. As illustrated, execute module 2100 includes master timeline control module 2102, math module 2104, physics module 2106, artificial intelligence (AI) module 2108, report generator 2110, and graphics module 2112.

Master timeline control module 2102 is a scheduler that is used to apply events to the definitions over time within execute module 2100. Math module 2104 and physics module 2106 provide for calculations needed to determine effects of actions on different objects. Artificial intelligence module 2108 is a component used to run source code for different artificial intelligence components to aid in the simulation of human behavior as events are applied to definitions by master timeline control module 2102.

Graphics module 2112 generates graphics data to send to the GUI processor for presentation at the end devices. Report generator 2110 generates two types of outputs in these examples. One type of output is a new definition that is used to modify the source code. This output generated is, for example, HBDL 1718 in FIG. 17. The other type of output generated by report generator 2110 is the graphics data, which also is formatted in HBDL in these examples. This output is, for example, IHBDL 1710 in FIG. 17.

Graphics module 2112 includes a number of different types of processes used to generate output representing results of a simulation to a user. These types of processes include, two dimensional graphics pipelines, two dimensional graphics primitives, three dimensional graphics pipelines, three dimensional graphics primitives, two dimensional and three dimensional model and stacks, a display list generator, and two dimensional and three dimensional rendering engines. These, as well as other types of graphics processes, may be present in graphics module 2112 for use in generating output for presentation to a user.

Figure 22:
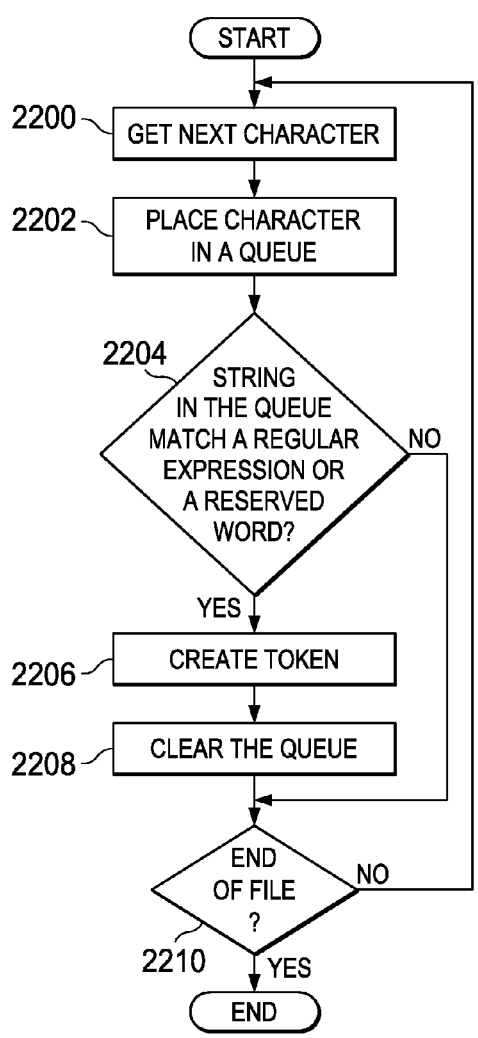
FIG. 22 is a flowchart of a process for generating tokens in accordance with an advantageous embodiment.

Turning now to FIG. 22, a flowchart of a process for generating tokens is depicted in accordance with an advantageous embodiment. The process illustrated in FIG. 22 may be implemented in a software component, such as lexical analyzer 1728 in FIG. 17.

The process begins by receiving the next character from the source (operation 2200). In these examples, the source of characters is HBDL 1708 in FIG. 17. The character is placed into a queue (operation 2202).

Next, a determination is made as to whether a match is present between the string in the queue and regular expression or a reserved word (operation 2204). If a match is present, a token is created using the string in the queue (operation 2206). The queue is then cleared (operation 2208).

Thereafter, a determination is made as to whether an end of file has been reached in the source (operation 2210). If an end of file has been reached, the process terminates. Otherwise, the process returns to operation 2200 to obtain the next character. If a string match does not occur in operation 2204, the process proceeds to operation 2210 as described above.

Figure 23:
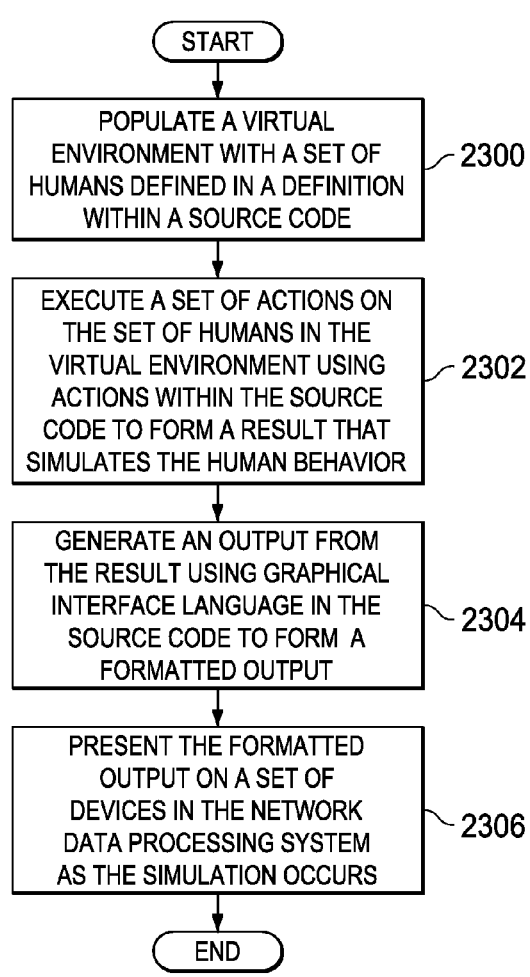
FIG. 23 is a flowchart of a process for executing the simulation of human behavior in accordance with an advantageous embodiment.

Turning now to FIG. 23, a flowchart of a process for executing the simulation of human behavior is depicted in accordance with an advantageous embodiment. The process illustrated is FIG. 23, may be implemented in a framework, such as framework 400 in FIG. 4. In particular, this simulation may be executed using source code, such as source code 600 in FIG. 6.

The process begins by populating a virtual environment with a set of humans defined in a definition within a source code (operation 2300). In these examples, the definition is a definition, such as definition 602 in FIG. 6. The process executes a set of actions on the set of humans in the virtual environment using actions within the source code to form a result that simulates the human behavior (operation 2302). In these examples, the set of actions may be taken from actions, such as actions 604 in FIG. 6.

Thereafter, an output is generated from the result using graphical interface language in the source code to form a formatted output (operation 2304). In these examples, the graphical user interface language may be GUI language 606 in FIG. 6. Thereafter, the formatted output is presented on a set of devices in the network data processing system as the simulation occurs (operation 2306), with the process terminating thereafter.

In this manner, the different advantageous embodiments simulate human behavior through a source code that may change as the simulation occurs. Further, the graphical user interface language allows for the manner in results are presented to a user to change and be controlled by the simulation itself.

Figure 24:
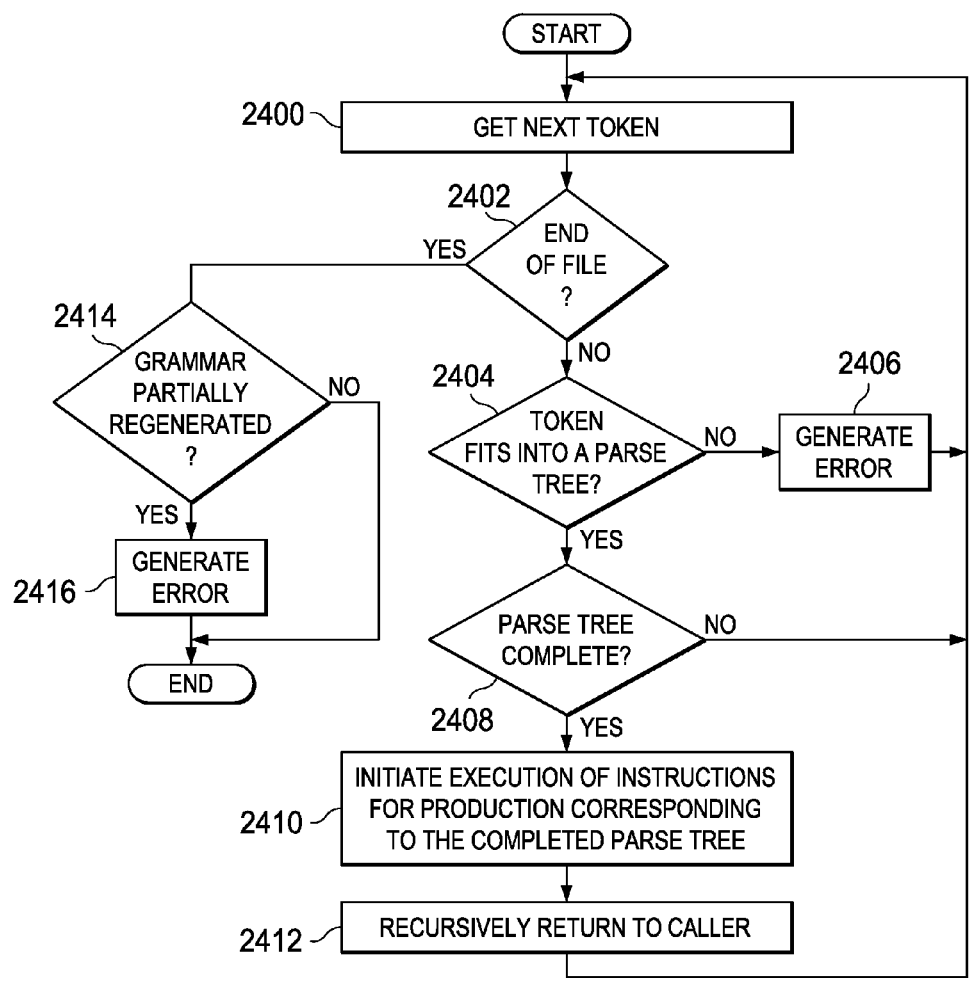
FIG. 24 is a flowchart of a process for generating sentences or productions in accordance with an advantageous embodiment.

Turning now to FIG. 24, a flowchart of a process for generating sentences or productions is depicted in accordance with an advantageous embodiment. The process illustrated in FIG. 19 may be implemented in a software component, such as grammar parser 1730 in FIG. 17.

The process begins by obtaining the next token for processing (operation 2400). In these examples, the token is received from a lexical parser, such as lexical parser 1728 in FIG. 17. A determination is made as to whether an end of file has been encountered with respect to the token (operation 2402). If an end of file has not been encountered, a determination is made as to whether the token fits into a parse tree (operation 2404). If the token does not fit into a parse tree, an error is generated (operation 2406) with the processing then returning to operation 2400.

Otherwise, a determination is made as to whether the token completes a parse tree (operation 2408). If the token completes the parse tree, execution of instructions for a production corresponding to the completed parse tree occurs (operation 2410). Thereafter, the process recursively returns to the caller (operation 2412) with the process then returning to operation 2400 as described above.

With reference again to operation 2408, if the parse tree is not complete, the process also returns to operation 2400. With reference back to operation 2402, if an end of file has been reached, a determination is made as to whether the grammar has been partially regenerated (operation 2414). This operation is performed to determine whether incomplete statements or productions are present. This determination may be made by examining the parse trees to see if incomplete parse trees are present. If the grammar is partially regenerated, an error is generated (operation 2416) with the process terminating thereafter. Otherwise, the process terminates without generating an error.

Figure 25:
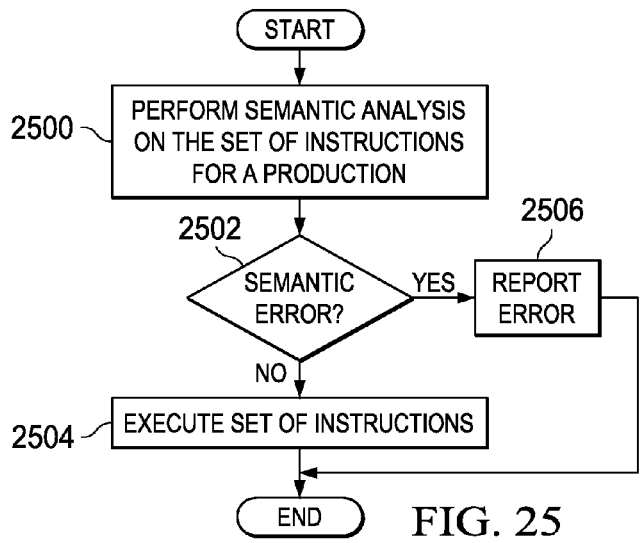
FIG. 25 is a flowchart of a process for executing statements for productions in accordance with an advantageous embodiment.

Turning now to FIG. 25, a flowchart of a process for executing statements for productions is depicted in accordance with an advantageous embodiment. The process illustrated in FIG. 25 may be implemented in a software component, such as execute module 1732 in FIG. 17.

The process begins by performing semantic analysis on the set of instructions for a production (operation 2500). This operation is performed to determine whether semantic errors occur in any instructions for a production. The set of instructions is one or more instructions in these examples. Thereafter, a determination is made as to whether a semantic error is present (operation 2502).

If a semantic error is not present, the process executes the set of instructions (operation 2504) with the process terminating thereafter. If in operation 2502 a semantic error occurs, the error is reported (operation 2506) with the process terminating thereafter. In some cases, rather than terminating, the process may attempt to correct the error to allow for execution of the instructions.

Figure 26:
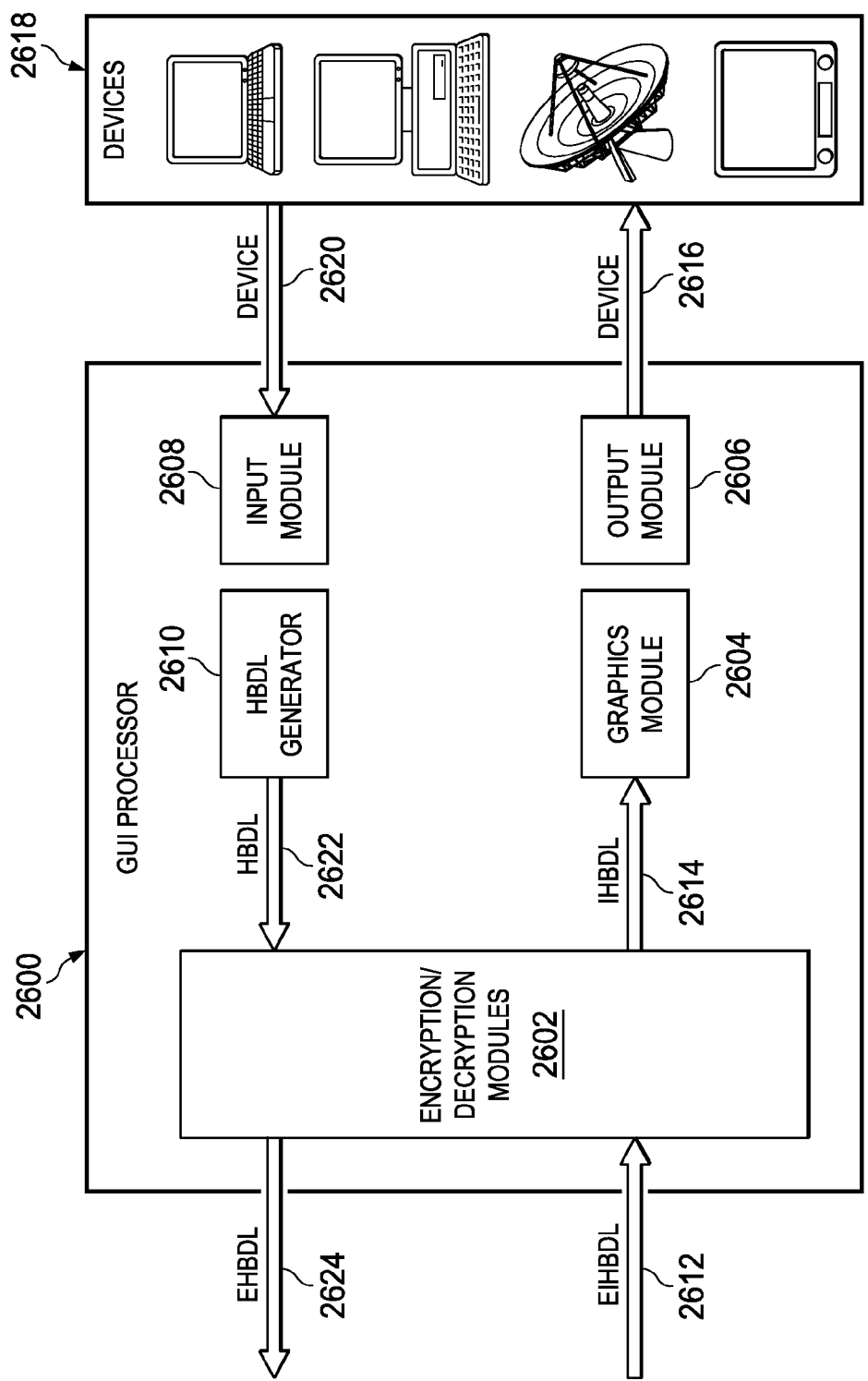
FIG. 26 is a diagram illustrating a graphical user interface (GUI) processor in accordance with an advantageous embodiment.

Turning now to FIG. 26, a diagram illustrating a graphical user interface (GUI) processor is depicted in accordance with an advantageous embodiment. GUI processor 2600 is a more detailed illustration of GUI processor 406 in FIG. 4. In this example, GUI processor 2600 includes encryption/decryption modules 2602, graphics module 2604, output module 2606, input module 2608, and HBDL generator 2610.

In these illustrative examples, GUI processor 2600 executes statements received from source code, such as source code 600 in FIG. 6. In particular, the statements include those from GUI language 606 in source code 600 in FIG. 6. The actual code for generating the displays are found in these sources, rather than being a separate application.

GUI processor 2600 executes the statements and receives user input. GUI processor 2600 receives encrypted interpreted HBDL (EIHBDL) 2612 from an interpreter such as interpreter 1700 in FIG. 17. Encryption/decryption module 2602 decrypts information to form interpreted HBDL (IHBDL) 2614, which is processed by graphics module 2604. In these examples, IHBDL 2614 represents primitives or a set of statements that may be used to generate the display for devices 2618.

Graphics module 2604 may generate the pixels for display in the devices 2618 and send that data to output module 2606, which in turn, transmits the data as device 2616 to devices 2618. User input is received as device 2620 from devices 2618 by input module 2608. This module sends the device data to HBDL generator 2610, which represents this user input in the form of HBDL 2622. HBDL 2622 is the user input written in HBDL. This input is encrypted by encryption/decryption module 2602 and returned to the interpreter as encrypted HBDL (EHBDL) 2624.

In these illustrative examples, GUI processor 2600 executes on hardware that is close to devices 2618. In fact, in many cases a portion of GUI processor 2600 may actually execute on devices 2618 with another portion executing on a data processing system, such as a server. GUI processor 2600 is located close to devices 2618 in a manner to reduce the use of network resources needed to present the data. Further, the placement of GUI processor 2600 is made in these examples to reduce latency in displaying data and receiving user input.

Figure 27:
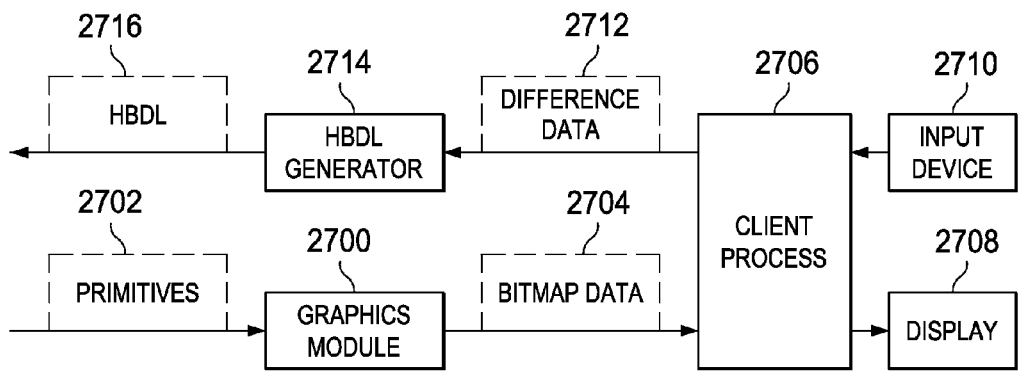
FIG. 27 is of a diagram illustrating data flow through a graphical user interface processor in accordance with an advantageous embodiment.

Turning now to FIG. 27, a flowchart of a diagram illustrating data flow through a graphical user interface (GUI) processor is depicted in accordance with an advantageous embodiment. In this example, graphics module 2700 is an example of graphics module 2604 in FIG. 26. Graphics module 2700 receives interpreted HBDL in the form of primitives 2702 in these examples. These primitives are the results of interpretation of the source code by the interpreter.

Graphics module 2700 processes these primitives to generate pixels for bitmaps and data identifying how the bitmaps may be manipulated or displayed. This information is sent as bitmap data 2704 to client process 2706. In these examples, client process 2706 is a process executing on a device, such as those in devices 1918 in FIG. 19. This client process performs the operations needed to display the bitmap data on display 2708. In this manner, the graphics processing necessary to render images for display are executed by graphics module 2700. Client process 2706 only displays the bitmap data provided and does not need the different processes and processing power needed to render bitmap graphics from primitives. With this division of processing, the devices displaying the data do not need the different graphic processors and graphics pipelines used in rendering graphics such as those used in workstations.

As a result, graphics may be displayed on a number of different devices that normally do not have sufficient processing power to handle the primitives. For example, client process 2706 and display 2708 may be implemented in a mobile phone, personal digital assistant, or tablet PC.

Input device 2710 receives user input with respect to data being displayed in display 2708. This user input may manipulate graphics, such as selecting a button, entering data, or sending a command. When a user modifies the displayed image through manipulating the bitmaps on display 2708, the difference or changes in the modification of the image being displayed are identified by client process 2706. These differences in the image form difference data 2712, which is returned to HBDL generator 2714.

HBDL generator 2714 is similar to HBDL generator 2610 in FIG. 26. HBDL generator 2210 identifies this change or delta in information and translates it into HBDL 2716 for transmission to the interpreter. HBDL 2716 contains statements or code in the language of the source code module and may be used to make changes to the source code. Graphics module 2700 uses primitives 2702 to generate pixels for the different bitmaps.

Figure 28:
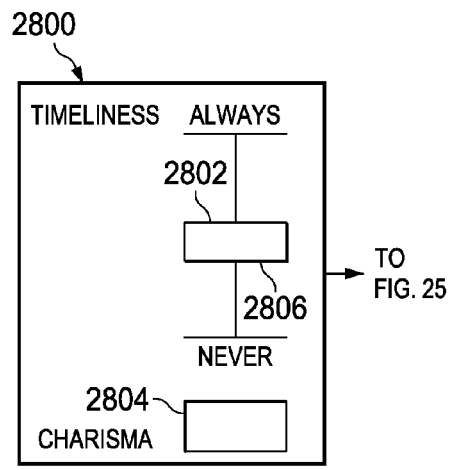
FIG. 28 is a diagram illustrating a display in accordance with an advantageous embodiment.
Figure 29:
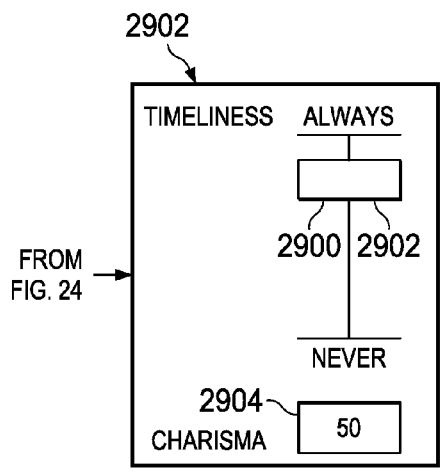
FIG. 29 is a diagram illustrating manipulation of a display in accordance with an advantageous embodiment.

Turning now to FIG. 28, a diagram illustrating manipulation of a display is depicted in accordance with an advantageous embodiment. In this illustrative example, display 2800 is an example of a display presented at display 2708 in FIG. 27. Display 2800 is presented using bitmaps generated from primitives. In this example, bitmaps are used to represent different components, such as slider 2802, and field 2804. The bitmap data used to represent slider 2802 and field 2804 are sent with data indicating how these bitmaps may be manipulated. In this example, slider 2802 may be moved through user input from position 2806 in FIG. 28 to position 2900 within display 2902 in FIG. 29, which is a modified version of display 2800. Further, a value, such as fifty may be entered into field 2804 as depicted in display 2902 in FIG. 29. These changes in the bitmaps are returned in accordance with an advantageous embodiment to the GUI processor, which then generates an appropriate statement for the source code based on these changes.

Figure 30:
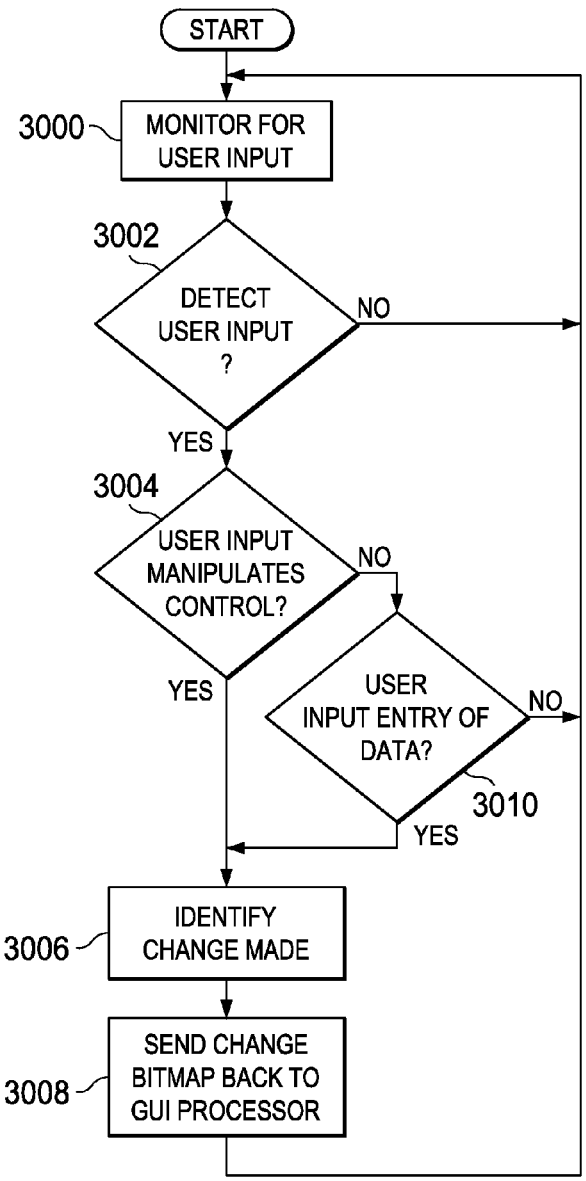
FIG. 30 is a flowchart of a process for identifying changes in bitmaps in accordance with an advantageous embodiment.

Turning now to FIG. 30, a flowchart of a process for identifying changes in bitmaps is depicted in accordance with an advantageous embodiment. The process illustrated in FIG. 30 is an example of the process that may be implemented in a client process at a device, such as client process 2706 in FIG. 27.

The process begins by monitoring for user input (operation 3000). A determination is then made as to whether user input is detected with respect to the display (operation 3002). If user input is not detected, the process returns to operation 3000. Otherwise, a determination is made as to whether the user input manipulates a control (operation 3004). If the user input manipulates a control, the change made to the control is identified in the bitmap (operation 3006). This difference or change in the bitmap is sent back to the GUI processor (operation 3008) with the process then returning to operation 3000 to monitor for additional user input. The data change may be the actual bitmap that is changed or an identification of the change in position of the bitmap, depending on the particular implementation. Of course, other types of changes may be used depending on the embodiment.

With reference again to operation 3004, if the user input is not a manipulation of a control, a determination is made as to whether the user input is an entry of data into a field (operation 3010). If the user input is not an entry of data, the process returns to operation 3000. Otherwise, the process proceeds to (operation 3006) to identify the change made in the bitmap.

The particular decisions made with respect to user input, in these examples, are ones for identifying changes to fields and controls in a display, such as execute module 2100 in FIG. 21. A determination may be for any type of change to a bitmap of interest. For example, the change may be whether a particular button has been selected or turned.

Figure 31:
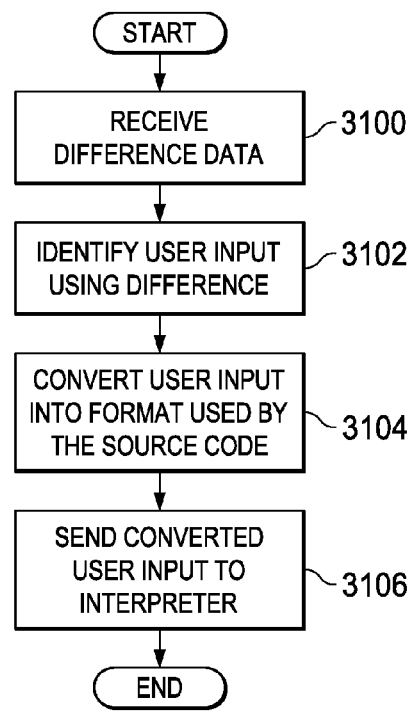
FIG. 31 is a flowchart of a process for handling difference data in accordance with an advantageous embodiment.

Turning now to FIG. 31, a flowchart of a process for handling difference data is depicted in accordance with an advantageous embodiment. The process illustrated in FIG. 31 may be implemented in a GUI processor, such as GUI processor 2600 in FIG. 26. In particular, the process illustrated in FIG. 31 may be implemented in HBDL generator 2714 in FIG. 27.

The process begins by receiving the difference data from a client process (operation 3100). In these examples, the difference data contains the changes in a bitmap made through user input. The process then identifies the user input based on the difference (operation 3102). This user input may be identified as, for example, a change of a slider position, an entry of data into a data field, or some other user input. The identification made in operation 3102 may be made by comparing the original bitmap sent to the device with the changed bitmap. For example, the user input may be to change the timeliness of a human if the difference is identified as a movement of a slider upwards along this type of control. An example of this type of difference is illustrated in FIG. 21 with respect to execute module 2100.

Thereafter, the user input is converted into a format used by the source code (operation 3104). In these examples, the user input is changed into a HPDL format. The converted user input is sent to the interpreter (operation 3106) with the process terminating thereafter.

Figure 32:
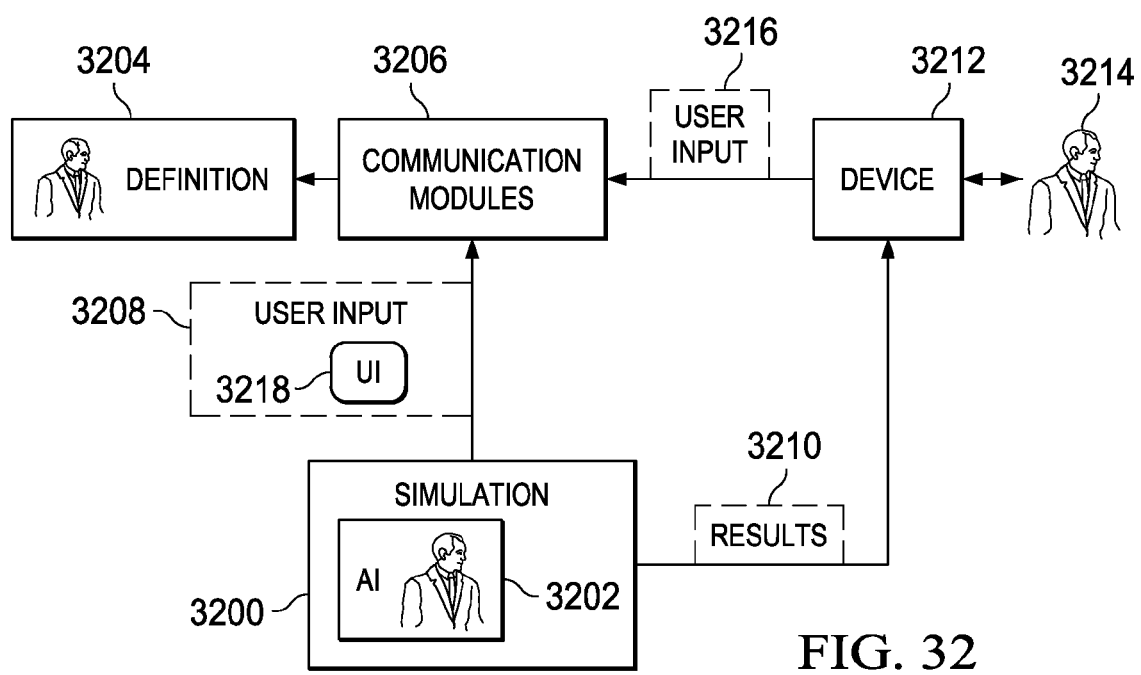
FIG. 32 is a diagram illustrating components for use in providing a human transparency paradigm in accordance with an advantageous embodiment.

With reference now to FIG. 32, a diagram illustrating components for use in providing a human transparency paradigm is depicted in accordance with an advantageous embodiment. In this illustrative example, simulation 3200 is executed using a framework, such as framework 400 in FIG. 4. In particular, simulation 3200 is executed through the interpretation of the source code by an interpreter, such as interpreter 404 in FIG. 4.

In this particular example, simulation 3200 includes artificial intelligence (AI) 3202, which represents a human within simulation 3200. This human being executed by artificial intelligence 3202 is a synthetic human in these examples. The code for artificial intelligence 3202 is retrieved from definition 3204 in addition to other information that is used for simulation 3200. Definition 3204 is found in source code, such as source code 402 in FIG. 4. Definition 3204 includes the definition of the synthetic human as well as other humans and the environment in which the humans are present for simulation 3200.

As results are generated during simulation 3200, these results are sent to communication modules 3206 as user input 3208. These communications modules, in this example, are also found in an interpreter, such as interpreter 404 in FIG. 4. Communication modules 3206 takes user input 3208 from simulation 3200 and modifies or writes new definitions into definition 3204. This forms modified source code, which is then used by simulation 3200 to produce additional results. Artificial intelligence 3202 logs into the framework in the same manner as a live user in these examples.

Further, results 3210 from simulation 3200 are sent to device 3212 for presentation to user 3214. In these examples, user 3214 is a real human.

The illustrative embodiments allow for the use of a human transparency paradigm. In this paradigm, user input 3208, generated by artificial intelligence 3202 that is rewritten into definition 3204, may be replaced with live user input from user 3214. In other words, user 3214 may send user input 3216 to communication modules 3206 to modify or write new definitions into definition 3204 in place of user input 3208, generated by the synthetic human simulated through artificial intelligence 3202 within simulation 3200. In these examples, user 3214 may be a subject matter expert, providing user input 3216. In these examples, user input 3216 is provided during simulation 3200. This user input may be in response to results received and presented at device 3212.

The synthetic human, simulated by artificial intelligence 3202, generates user input 3208 that is associated with unique identifier (UI) 3218 for the synthetic human. User input 3208 is generated by artificial intelligence 3202 during simulation 3200. User input 3216 is associated with unique identifier 3218. User input 3208 is sent to communication modules 3206. Communication modules 3206 modify definition 3204 by adding new definitions or modifying current definitions using user input 3208. Communication modules 3206 knows which portion of definition 3204 to modify based on unique identifier 3218.

When user 3214 generates user input 3216, user input 3216 is received by communication modules 3206. In these illustrative examples, user input 3216 also may include unique identifier 3218. In this manner, communication modules 3206 modifies definition 3204 for the synthetic human associated with unique identifier 3218.

In this manner, user 3214 may replace the synthetic human simulated through artificial intelligence 3202 within simulation 3200. User 3214 may turn artificial intelligence 3202 on and off on the fly, based on requests sent to communication modules 3206.

In initiating a replacement of user input 3208 with user input 3216, user 3214 at device 3212 sends a request to communication modules 3206. At this point, user 3214 is assumed to have logged on and have been authenticated by communication modules 3206. Communication modules 3206 determines whether user 3214 is authorized to turn on and off artificial intelligence 3202. In other words, communication modules 3206 determines whether user 3214 may replace the synthetic human. If user 3214 is authorized, communication modules 3206 sets a flag to stop using artificial intelligence 3202. In other words, functions for artificial intelligence 3202 are no longer called within simulation 3200.

At this point in time, user 3214 generates user input 3216 that includes unique identifier 3218. Depending on the particular implementation, unique identifier 3218 may be added by communication modules 3206 based on recognizing that user 3214 sends user input at device 3212.

Figure 33:
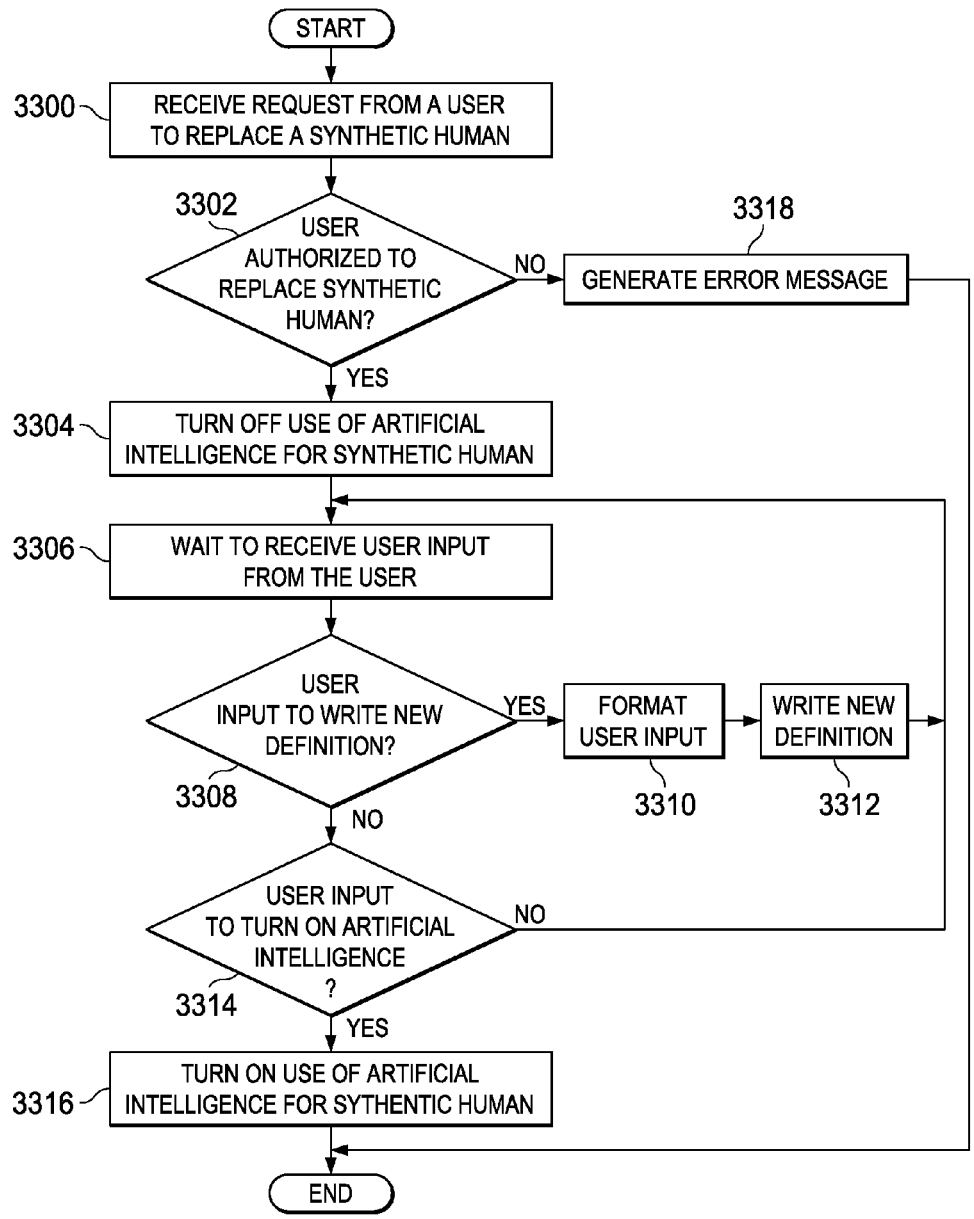
FIG. 33 is a flowchart of a process for replacing a synthetic human with a live human in accordance with an advantageous embodiment.

With reference now to FIG. 33, a flowchart of a process for replacing a synthetic human with a live human is depicted in accordance with an advantageous embodiment. In this example, the process illustrated in FIG. 33 may be implemented in an interpreter, such as interpreter 404 in FIG. 4. In particular, the process may be implemented in communication modules within interpreter 404.

The process begins by receiving a request from a user to replace a synthetic human (operation 3300). Thereafter, a determination is made as to whether the user is authorized to replace the simulated human (operation 3302). In these examples, the determination may be made by comparing the user with a list or database defining what users may replace synthetic humans during a simulation. For example, certain users may be subject matter experts in certain areas and allowed to replace synthetic humans for those particular areas. For example, a particular user may be a subject matter expert with respect to politics. That user may be allowed to replace a synthetic human that is a politician in the simulation. That subject matter user, however, may not be allowed to replace a synthetic human that is a farmer or a soldier because the subject matter expert does not have expertise in those areas.

The particular rules for what users may replace synthetic humans depend entirely on the particular implementation. If the user is authorized to replace the synthetic human, the use of the artificial intelligence for the synthetic human is turned off in the definitions (operation 3304).

Thereafter, the process waits for user input from the user (operation 3306). When user input is received, a determination is made as to whether the user input is to write a new definition in the definitions (operation 3308). If the user input is to write a new definition, the user input is formatted into a form for writing the new definition (operation 3310). Thereafter, the definition is written into the source code (operation 3312) with the process then returning to operation 3306 as described above.

With reference again to operation 3308, if the user input is not to write a new definition, a determination is made as to whether the user input is to turn on the artificial intelligence (operation 3314). If the user input is not to turn on the artificial intelligence, the process returns to operation 3306. Otherwise, the artificial intelligence is turned back on for use in simulating the synthetic human (operation 3316) with the process terminating thereafter. Operation 3316 places the synthetic human back in place in a simulation and removes the live human from the simulation.

With reference again to operation 3302, if the user is not authorized to replace the synthetic human, an error message is generated (operation 3318) with the process terminating thereafter.

The simulations provided by the framework are not intended predict human behavior with one-hundred percent certainly, but are intended to provide probabilities that may decisions or changes. The results from simulations provide guidance and predictions that are otherwise not possible with out the simulations made by framework.

In the different advantageous embodiments, source code 600 may be implemented using a language specifically designed to provide the different features in definition 602, actions 604, and GUI language 606 in FIG. 6. In other advantageous embodiments, source code 600 in FIG. 6 also may include functions and features from other existing languages or programming methodologies.

In the different advantageous embodiments, artificial intelligence systems may be used to implement portions of source code 600, such as, for example, definition 602 and/or actions 604 in FIG. 6. In some advantageous embodiments, artificial intelligence, in the form of a neural network (or other forms of artificial intelligence), may be used to simulate various objects. For example, a neural network may be used to simulate a living or live object, such as a person or an animal.

The artificial intelligence may be, for example, conventional artificial intelligence in which machine learning characterized by formalism and statistical analysis is used. Additionally, artificial intelligence may be, for example, in the form of computational intelligence. Computational intelligence involves an iterative development or learning. This type of artificial intelligence may learn based on empirical data. Examples of computational intelligence include, for example, without limitation, neural networks, fuzzy logic, and genetic algorithms. These programming techniques may be used to supplement or provide additional features within source code 600 in FIG. 6. In other advantageous embodiments, source code 600 in FIG. 6 may be implemented using an existing programming language in addition to or in conjunction with various programming techniques.

In one advantageous embodiment, a programming technique such as a neural network may be used to implement portions of source code 600 in FIG. 6. For example, portions or all of definition 602 in FIG. 6 may be implemented using neural networks. A neural network is a mathematical computational model based on biological neural networks. Neural networks provide non-linear statistical data modeling pools and may be used to model complex relationships between inputs and outputs. Neural networks may be employed to provide learning functions for various objects within definition 602 in FIG. 6.

In one example, neural network techniques may be used to provide learning features for different objects such as people, animals, or other suitable objects within definition 602 of source code 600 in FIG. 6. In this type of example, NN denotes a neural network type variable. An example of declaration may be "NN n;". This type of statement declares a neural network variable, in this example. Children, n.input, n.output, and n.hidden also may be created. These other variables represent input, output, and hidden layers in the neural network. These layers allow a user to add neurons to the different layers. With these different layers, input neurons may be added as children to the input neural network layer.

Turning to FIG. 34, statements 3400 and 3402 are examples of input neurons. Section 3404 in statement 3400 declares "left operand" as an input neuron for the neural network n. This input member also may be used to read the total number of input neurons. The value of the member "input" is incremented by one each time a new member is added. As a result, the input value is the total number of input neurons. These statements are examples of HBDL pseudo code that could be implemented using C language. Other languages, such as, for example, C+ and/or Objective-C.

In these examples, input neuron variables may range from a value of zero to a value of one. Each input neuron variable has a minimum range and a maximum range. These ranges allow a user to enter any value within the range. These values also may be normalized before use, depending on the particular implementation.

With reference to FIG. 35, statements 3500 and 3502 are examples of input ranges defined for the input neuron left operand. In this example, statement 3500 defines a minimum value of minus ten and statement 3502 defines a maximum value of ten.

With reference now to FIG. 36, a diagram of a statement for input behavior is depicted in accordance with an advantageous embodiment. Statement 3600 allows an input neuron to be modified before the input neuron is used. In other words, an input neuron may have code attached or associated with the neuron to allow manipulation of the user input by that neuron. For example, the user input may be short and long. In this example, the neuron input behavior interprets short and long to evaluate between zero and one. Statement 3600 is an example of a code that may be used to attach this type of behavior to the input neuron.

Turning next to FIG. 37, a diagram illustrating an output declaration is depicted in accordance with an advantageous embodiment. Statement 3700 is an example of a statement used to add children to the output neural network layer.

With reference now to FIG. 38, a diagram illustrating statements for output ranges in a neural network is depicted in accordance with an advantageous embodiment. In this example, statements 3800 and 3802 are examples of ranges that may be set for an output neuron. A minimum and maximum range is set by statements 3800 and 3802.

In this particular example, the minimum value is minus fifty while the maximum value is fifty for the output neuron. Further, a user may convert an implicit normalized output to a value within the specified ranges. For example, an output of one may be converted to 50, while an output of 0.5 is converted to 0. Further, an output neuron also may be associated with the code to manipulate the output.

Turning now to FIG. 39, a diagram illustrating a statement for modifying output behavior is depicted in accordance with an advantageous embodiment. Statement 3900 is an example of code that may be associated with an output neuron. In this example, the user output may be low and high. With this particular example, the output behavior of the neuron may interpret a value between zero and one to low and high.

Turning now to FIG. 40, a diagram illustrating statements for hidden layers is depicted in accordance with an advantageous embodiment. Statements 4000 and 4002 are examples of statements that may be used to declare hidden layers of any neural network. A hidden layer order follows the order of hidden layer declarations, in these examples. The value of a hidden layer variable specifies the number of neurons assigned to a particular hidden layer. Statements 4000 and 4002 declare two hidden layers, in these examples. The first layer defined by statement 4000 includes five neurons and the second layer declared in statement 4002 defines three neurons.

With reference now to FIG. 41, code 4100 illustrates a sample neural network member being used to specify a neural sample value. Different samples may be specified. Each input and output neuron includes "sample [int]" within the statements. When a neural network is completed, a user may train and use the neural network.

With reference now to FIG. 42, example statements for training a neural network are depicted in accordance with an advantageous embodiment. Statements 4200, 4202, and 4204 are examples of statements used to perform neural network training. Statement 4200 indicates that the neural network will be trained 500 times. Statement 4202 indicates 300 times, and statement 4204 indicates 200 times for the training. In these examples, the training is cumulative with results being stored. These different results may be stored within definition 602 or source code 602 in FIG. 6 for a particular object.

Turning now to FIG. 43, a diagram illustrating a compute function in a neural network is depicted in accordance with an advantageous embodiment. In this example, statement 4300 and statement 4302 provide an example of statements used to have the input neuron perform a function and return a result. Statement 4304 is an alternative expression of statements 4300 and 4302, in these examples.

With reference now to FIG. 44, a diagram illustrating an example of a neural network is depicted in accordance with an advantageous embodiment. In this example, code 4400 includes a definition of a neural network along with statements to train and execute the neural network. Input declarations are found in section 4402. Input ranges are found in sections 4404 and 4406. Code associated with neurons are found in statements 4408 and 4410. Output ranges are found in section 4412 and behavior for the output is found in statement 4414.

Hidden layers are defined in section 4416 and the functionality is found in statement 4418. Samples may be found in section 4420 and statement 4422 is an example of a training statement. Section 4424 illustrates examples of statements used to operate the neural network. Statement 4426 within section 4424 displays the results.

Figures 45, 46:
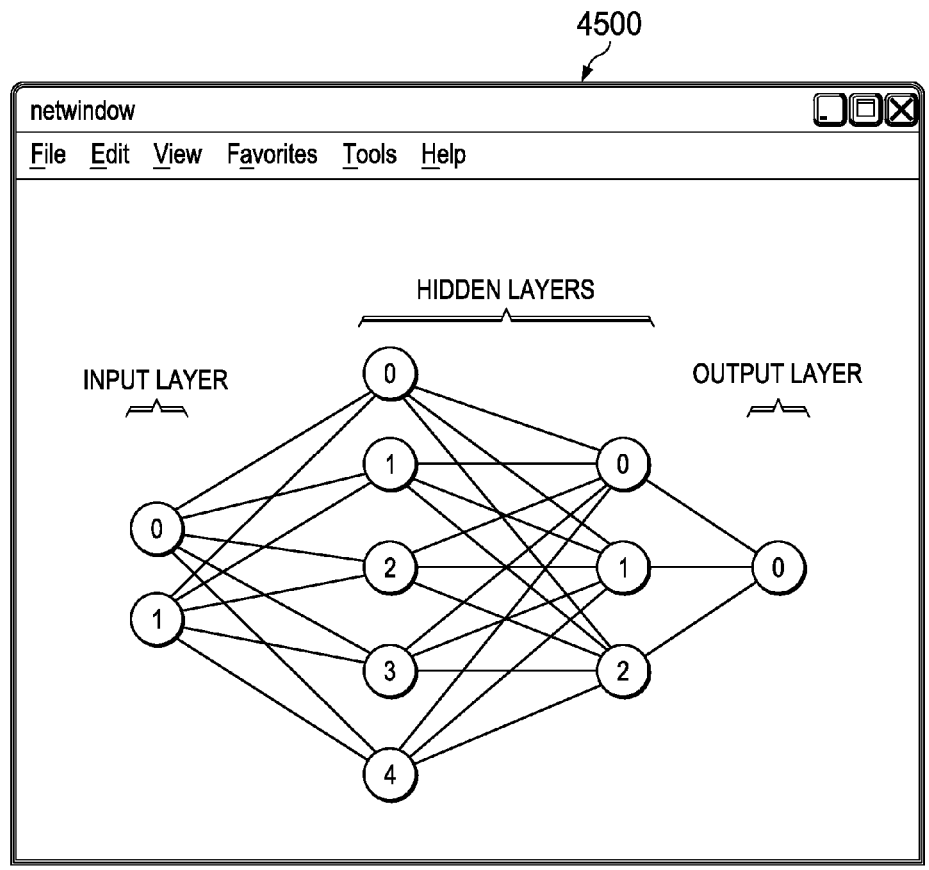
FIG. 45 is a diagram illustrating the results from the operation of a neural network in accordance with an advantageous embodiment.
FIG. 46 is a diagram illustrating an example of a list in accordance with an advantageous embodiment.

Turning now to FIG. 45, a diagram illustrating the results from the operation of a neural network is depicted in accordance with an advantageous embodiment. In this example, display 4500 is an example of a display generated in response to a show statement 4426 from code 4400 in FIG. 44.

In addition to neural networks, dynamic lists may be used to manage various attributes and properties of objects within definition 602 in FIG. 6. Dynamic lists may be used to define characteristics, such as characteristics 804 in object 800 in FIG. 8 and characteristics 904 for object 900 in FIG. 9.

For example, dynamic lists may be used to provide an identification of components, capabilities, characteristics, or other suitable parameters for an object. For example, if an object is a car, a dynamic list may be used to identify components, such as wheels, engine, body, paint, transmission, windows, and other components. As components are added to or removed from a car, the list may be modified to identify these changes.

In the different advantageous embodiments, any variable may be used in a list. With a dynamic list, definitions are not constrained by having to predefine list sizes based on expected components or parameters. Instead, the list size may change as various parameters or components are added or removed from a particular definition.

With reference to FIG. 46, a diagram illustrating an example of a list is depicted in accordance with an advantageous embodiment. In this example, code 4600 defines a list one in statement 4600. Statements 4602, 4604, and 4606 identify three variables with values in list one. In this example, list one acts as an array. Statement 4608 in code 4600 is an example of a size function that returns a value identifying the size of the array. In this example, statement 4608 returns a value of three.

Statements 4610 and 4612 are examples of statements used to search the list in code 4600. Statement 4610 returns a value of two which is equivalent to true, while statement 4612 returns a value of zero which is equivalent to false. These search functions in statements 4610 and 4612 may be used to determine whether the list contains a certain value. If the certain value is present in the list, the index to that value in the list is returned. Otherwise, a value of zero is returned.

Turning now to FIG. 47, a diagram illustrating deleting a variable from the list is depicted in accordance with an advantageous embodiment. In this example, code 4700 includes a list as defined in section 4702. Statement 4704 is a delete function that may be used to delete an item from the list in code 4700. Statement 4704 searches the list to determine whether a particular item is present in the list. If the item is found, the item is removed from the list. Statement 4704 returns an index identifying the item removed. Otherwise, statement 4704 returns a zero. In this example, the value twenty-five is not present in the list in code 4700, a zero is returned, and no action is taken. In this example, items are deleted by identifying values.

With reference now to FIG. 48, a diagram of code for deleting items is depicted in accordance with an advantageous embodiment. In this example, code 4800 defines a list in section 4802. Statements 4804 and 4806 are statements used to delete items in the list based on index values. If a statement identifies an index value less than the list size, the item is located in the list and deleted. The function then returns a value for the deleted item. Otherwise, a zero is returned meaning that the item was not found in the list. Statement 4804 returns a zero because only three items are present in the list as defined in section 4802. Statement 4806 results in a twenty being returned with the item defined in statement 4808 being deleted.

With reference now to FIG. 49, a diagram illustrating code to manipulate items in the list is depicted in accordance with an advantageous embodiment. In this example, code 4900 may be used to manipulate items in a list. In these examples, code 4900 contains push and pop functions to use the list of the stack. Statement 4902 identifies the list for which manipulations are to be made. In this example, section 4904 identifies three pushes made to the list. Statement 4906 illustrates a pop made to the list. Statement 4906 returns a value from the item popped from the front of the list.

These types of functions are similar to those used to manipulate stacks in computer systems. A push is used to push or move a particular item to the top of the list. A pop is used to return a value for the item at the top of the list. If a pop statement includes a value or parameter, this statement pops or returns values from the stack according to the value of the parameter. In statement 4908, the item being popped is the item that has an index value of three, which is the third item in the list, in these examples.

Turning now to FIG. 50, a diagram illustrating the use of the list as a queue is depicted in accordance with an advantageous embodiment. In this example, code 5000 illustrates enqueue and dequeue functions that may be used to manipulate a list as a queue. An enqueue function, such as that shown in statement 5002, adds an argument to the bottom of the list.

A dequeue function, such as that shown in statement 5004, removes the top item from the list and returns a value of that item. In this example, statement 5002 adds an item to list one, statement 5006 adds another item to the top of the queue. The item in statement 5002 is now second in the queue. Statement 5008 adds yet another item to the queue pushing the other items lower into the queue.

Turning now to FIG. 51, a diagram illustrating reading items in the list is depicted in accordance with an advantageous embodiment. In this example, code 5100 illustrates reading items from the top and bottom of the list as defined in section 5102. Statement 5104 reads the item located at the top of the list and statement 5106 reads the item contained at the bottom of the list.

Turning now to FIG. 52, a diagram illustrating a sort attribute in a list is depicted in accordance with an advantageous embodiment. Code 5200 contains statements used to identify the sorting status for a list. Statement 5202 identifies whether a sorting status is set for the list. If statement 5202 is set equal to true, then items are inserted into the list according to their value. Statement 5204 identifies a sorting order.

If statement 5204 is set equal to true, the list is sorted in descending order from smallest to largest. In this example, statement 5204 is set equal to false. As a result, items are added to the list in descending order as shown in section 5206. Further, additional statements may be used to sort the list in various orders.

Another example of a programming technique that may be used to implement source code 600 in FIG. 6 is fuzzy logic. An example of a language used to implement fuzzy logic is Prolog, which is a logic programming language that may be used for fuzzy logic and artificial intelligence programming.

In the depicted examples, the fuzzy logic system may be based on logical statements in which operands are terms taken from several sets. In one example, the sets may be, for example, fuel, distance, and speed. Fuel may contain three terms, low, medium, and high. Distance may be near and far. Speed may be low, medium, and high, in these examples. These sets may be used to apply rules, such as if the fuel is low or the distance is near, then the speed is low. Another rule is if the fuel is medium and the distance is far, then the speed is medium. A third rule is if the fuel is high and the distance is far, then the speed is high. With fuzzy logic, ranges may be set for the different members of the set. These ranges include a minimum and a maximum range.

Turning now to FIG. 53, an example of a fuzzy logic implementation using fuel distance and speed is depicted in accordance with an advantageous embodiment. In this example, code 5300 defines these sets in section 5302. The fuel integer, while distance and speed are floating variables. Section 5304 identifies a minimum and maximum range for the fuel as being between 0 and 100.

Starting and ending terms for the fuel are defined in section 5306. This section identifies the left and right edges of a fuzzy set. Sections 5308, 5310, and 5312 identify terms for the fuel. Section 5308 identifies a trapezoid term, section 5310 identifies a triangular term, and section 5312 identifies a bell curve term.

Similar definitions for distance are found in section 5314. The rules for the fuzzy logic are defined in section 5316, in this example. Section 5318 identifies the initial values for fuel and distance. Statement 5320 is used to compute the speed.

Another type of programming technique that may be used to simulate various objects within source code 600 in FIG. 6 involves evolutionary computation. Evolutionary computation is a type of artificial intelligence. One specific method or methodology is a genetic algorithm. This algorithm is a search technique used to identify solutions. This type of technique is considered a global search heuristic type of technique. With a genetic algorithm, genes may be declared as well as chromosomes. Fitness function, selection process, and recombination functions also are specified using this type of technique.

Turning now to FIG. 54, a diagram illustrating the solving of an equation using a genetic algorithm is depicted in accordance with an advantageous embodiment. In this example, code 5400 is used to solve equation $2X+3Y=20$.

In this example, two genes are initialized in section 5402. These two genes correspond to variables X and Y. Chromosomes are added to the genes in section 5404. Code for a fitness function may be identified in statement 5406. Code for a selection function may be specified using statement 5408. Code for a recombination function may be specified in statement 5410.

The code for these functions may be implemented using any available function for the particular statement. These selection processes are used to select the most appropriate or best fit chromosome as specified by a code. For example, a roulette wheel selection process may be used. With respect to a recombination function in statement 5410, this statement may be used to identify code to build a new generation of chromosomes.

In one example, a binary variable cross-over method may be used. Statement 5412 specifies an error margin for the process and statement 5414 calls an evolve function in code 5400. The evolution process identified in statement 5414 stops whenever the error margin of the most fit chromosome is less than the error specified in statement 5412, in these examples. By executing the process as defined in code 5400, gene X returns the values of X that most fit the chromosome and gene Y returns the values of Y that most fit the chromosome.

Turning now to FIGS. 55A and 55B, a diagram illustrating code for an object in source code is depicted in accordance with an advantageous embodiment. In this example, code 5500 is an example of a definition for an object in the form of a forest. Section 5502 identifies colors for trees in the forest. Section 5504 in code 5500 identifies a grid for the forest. Section 5506 defines trees that may be present in the grid for the forest. Section 5508 identifies a row of tree for the forest. Section 5510 is used to generate a patch of trees, which contains one or more rows of trees as defined in section 5508. Section 5512 is an example of code that may be used to present the forest. In these examples, lines 5514 and 5516 are translation statements used to provide for randomness within the forest. Other statements, such as, for example, rotation and/or scale statements also may be used in addition to or in place of these statements.

In these examples, code 5500 is written using C language. Of course, any language may be used to generate a definition for a forest. Further, the presentation of a forest is the example of one object that may be found in definition 602 in source code 600 in FIG. 6. Of course, code may be generated using any language or for any object, depending on the particular implementation.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD. In these examples, a physical or tangible computer readable medium is referred to as a recordable computer storage medium.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the present disclosure has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. An apparatus for simulating human behavior, the apparatus comprising:
    source code located on a storage system in a network data processing system, wherein the source code is written in a language for predicting human behavior;
    an interpreter executing on hardware in the network data processing system, the interpreter including a language interpreter and a communications module, wherein the language interpreter executes a simulation with the source code using artificial intelligence to generate a new definition and interpreted source code;
    a graphical user interface processor executing on the hardware in the network data processing system, wherein the graphical user interface processor receives the interpreted source code from the language interpreter to form received interpreted source code and generates device dependent output using the received interpreted source code; and
    a set of devices in communication with the graphical user interface processor, wherein the set of devices displays the device dependent output, wherein the set of devices receives user input to form received user input and sends the received user input to the graphical user interface processor, and wherein the communications module receives the received user input from the graphical user interface processor and the new definition from the language interpreter, modifies the source code with the received user input and the new definition to form modified source code that is executed by the language interpreter.

2. The apparatus of claim 1, wherein interpreter further includes a first encryption and decryption module and wherein the graphical user interface processor further includes a second encryption and decryption module, wherein the first encryption module encrypts the device dependent output to form encrypted output and sends the encrypted output to the second encryption and decryption module, wherein the second encryption and decryption module decrypts to encrypted output to form the received interpreted source code.

3. The apparatus of claim 1, wherein the language interpreter comprises:
    a language analyzer, wherein the language analyzer identifies tokens in the source code to form identified tokens;
    a grammar parser, wherein grammar parser creates sentences using the identified tokens; and
    an execution module, wherein the execution module executes the sentences created by the grammar parser using the artificial intelligence.

4. The apparatus of claim 3, wherein the communications module comprises:
    a registration module;
    an input module; and
    a dispatcher module.

5. The apparatus of claim 1, wherein the storage system is a plurality of storage devices.

6. The apparatus of claim 5, wherein the plurality of storage devices are in different locations in the network data processing system.

7. The apparatus of claim 1, wherein the graphical user interface processor executes on a first portion of the hardware and wherein the interpreter executes on a second portion of the hardware.

8. The apparatus of claim 1, wherein the language interpreter identifies tokens in the language in the source code, creates sentences for the language, and executes actions from sentences.

9. The apparatus of claim 1, wherein the language interpreter generates device dependent output in a form of a set of device dependent output streams.

10. An apparatus comprising:
    source code located on a storage system in a network data processing system;
    an interpreter executing in the network data processing system, wherein the interpreter executes a simulation with the source code generating interpreted source code, wherein interpreter modifies the source code using the interpreted source code to form a feedback loop that results in modified source code that is executed by the interpreter;
    a graphical user interface processor executing in the network data processing system, wherein the graphical user interface processor receives the interpreted source code from the language interpreter and generates device dependent output; and
    a set of devices in communication with the graphical user interface processor, wherein the set of devices displays the device dependent output generated by the graphical user interface processor, wherein the set of devices receives user input to form received user input and sends the received user input to the graphical user interface processor and wherein the interpreter processes the received user input from the graphical user interface processor to modify the source code to form the modified source code that is executed by the interpreter.

11. The apparatus of claim 10, wherein the interpreter executes the simulation using artificial intelligence.

12. The apparatus of claim 10, wherein the storage system on which the source code is located comprises a plurality of storage devices located in different portions of the network data processing system.

13. A computer implemented method for simulating human behavior, the computer implemented method comprising:
   retrieving data from source code stored in a storage system in a network data processing system to from retrieved data;
   interpreting the retrieved data to perform a simulation of the human behavior using an interpreter executing on the network data processing system to generate results;
   generating device dependent data from the results using a graphical user interface processor executing on the network data processing system, wherein the device dependent data may be used to present the results;
   modifying the source code using the results to form modified source code, wherein the modified source code provides new data utilized in subsequent interpretations to predict the human behavior;
   presenting the device dependent data on a set of devices in communication with the graphical user interface processor, and wherein the set of devices displays the device dependent data generated by the graphical user interface processor;
   receiving user input from the set of devices at the interpreter to form received user input;
   modifying the source code, by the interpreter, using the received user input to form the modified source code; and
   continuing to perform the simulation of the human behavior at the interpreter using the modified source code.

14. The computer implemented method of claim 13 further comprising:
   sending the results from the interpreter to the graphical user interface in an encrypted format.

15. The computer implemented method of claim 13, wherein the graphical user interface processor is located on a plurality of different data processing systems.

16. A computer implemented method for predicting human behavior, the computer implemented method comprising:
   retrieving a source code from a storage system by an interpreter to form retrieved source code;
   executing actions using the retrieved source code at the interpreter, wherein a definition modification occurs in response to executing the initial actions;
   modifying the source code in the storage system using the definition modification to form current source code;
   executing subsequent actions at the interpreter using the current source code to generate results, wherein a continual feedback of new definition modifications are generated to continually modify the current source code being executed by the interpreter occurs;
   presenting the results on a set of devices in communication with a graphical user interface processor; and
   responsive to receiving a user input at the set of devices, modifying definitions in the current source code utilizing the user input, wherein the current source code is modified by both the user input and the continual feedback of new definition modifications to form modified source code that is executed by the interpreter.

17. The computer implemented method of claim 16, wherein the presenting step comprises:
   generating device data; and
   sending the device data to a set of devices for presentation.

18. A computer program product comprising:
   a computer usable medium having computer usable program code for simulating human behavior, the computer program medium comprising:
   computer usable program code for retrieving data from source code stored in a storage system in a network data processing system to from retrieved data;
   computer usable program code for interpreting the retrieved data to perform a simulation of the human behavior using an interpreter executing on the network data processing system to generate results;
   computer usable program code for generating device dependent data from the results using a graphical user interface processor executing on the network data processing system, wherein the device dependent data may be used to present the results;
   computer usable program code for modifying the source code using the results to form modified source code, wherein the modified source code provides new data utilized in subsequent interpretations to predict the human behavior;
   computer usable program code for displaying the device dependent data generated by the graphical user interface processor using a set of devices;
   computer usable program code for receiving user input from the set of devices at the interpreter to form received user input;
   computer usable program code for modifying the source code, by the interpreter, using the received user input to form the modified source code; and
   computer usable program code for continuing to perform the simulation of the human behavior at the interpreter using the modified source code.

* * * * *